United States Patent
Sato et al.

(10) Patent No.: US 8,588,131 B2
(45) Date of Patent: Nov. 19, 2013

(54) WIRELESS SLAVE UNIT

(75) Inventors: Shuichi Sato, Osaka (JP); Yasuo Hamamoto, Osaka (JP); Hiroshi Hayashino, Hyogo (JP); Kazuhiro Ohta, Hyogo (JP); Yosuke Ukita, Osaka (JP); Hironori Nakae, Osaka (JP); Yoshitaka Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 1173 days.

(21) Appl. No.: 11/629,295

(22) PCT Filed: Jun. 13, 2005

(86) PCT No.: PCT/JP2005/010781
§ 371 (c)(1),
(2), (4) Date: Aug. 26, 2008

(87) PCT Pub. No.: WO2005/125113
PCT Pub. Date: Dec. 29, 2005

(65) Prior Publication Data
US 2009/0161600 A1 Jun. 25, 2009

(30) Foreign Application Priority Data

Jun. 16, 2004 (JP) .................................. 2004-177858
Feb. 8, 2005 (JP) .................................. 2005-032141

(51) Int. Cl.
*H04W 4/00* (2009.01)

(52) U.S. Cl.
USPC .......................................................... 370/328

(58) Field of Classification Search
USPC ........................... 370/328, 329, 330, 331, 332
See application file for complete search history.

(56) References Cited

U.S. PATENT DOCUMENTS 5,682,381 A * 10/1997 Sekihata et al. ............... 370/332
5,852,405 A * 12/1998 Yoneda et al. ............ 340/825.02
(Continued)

FOREIGN PATENT DOCUMENTS

| JP | 08-046636 | 2/1996 |
| JP | 08-274804 | 10/1996 |

(Continued)

OTHER PUBLICATIONS

Yoshihiro Ohtani, et al., "The Journal of the Institute of Image Information and Television Engineers", The Institute of Image Information Television Engineers, vol. 57, No. 11, 2003 (English Translation Provided).

(Continued)

*Primary Examiner* — Mark Rinehart
*Assistant Examiner* — Mohammad Anwar
(74) *Attorney, Agent, or Firm* — Wenderoth, Lind & Ponack, L.L.P.

(57) ABSTRACT

A wireless slave device for performing wireless network communication with another wireless slave device, the other wireless slave device being connected to a terminal, and wired network communication with a terminal, the wireless slave device including a wireless reception unit that wirelessly receives a notification frame including a MAC address of the terminal connected to the other wireless slave device and a MAC address of the other wireless slave device, a storage unit that associates and stores the MAC address of the other wireless slave device and the MAC address of the terminal both included in the wirelessly received notification frame, a wire reception unit that receives a frame transmitted from the terminal connected to the wireless slave device, and a filtering unit that discards the frame if the transmission destination MAC address of the frame received by wire does not match the MAC address stored in the storage unit.

5 Claims, 24 Drawing Sheets

(56) References Cited

U.S. PATENT DOCUMENTS

| | | | |
|---|---|---|---|
| 6,940,831 B1* | 9/2005 | Omi et al. | 370/310.1 |
| 7,319,714 B2* | 1/2008 | Sakata et al. | 375/211 |
| 7,330,456 B2* | 2/2008 | Yeh | 370/338 |
| 2001/0049825 A1* | 12/2001 | Hirose et al. | 725/111 |
| 2003/0162506 A1* | 8/2003 | Toshimitsu et al. | 455/70 |
| 2004/0125744 A1 | 7/2004 | Perrot et al. | |
| 2005/0192013 A1 | 9/2005 | Perrot et al. | |

FOREIGN PATENT DOCUMENTS

| | | |
|---|---|---|
| JP | 11-355318 | 12/1999 |
| JP | 2002-094516 | 3/2002 |
| JP | 2003-318938 | 11/2003 |
| JP | 2004-104793 | 4/2004 |
| JP | 2004-147159 | 5/2004 |

OTHER PUBLICATIONS

LAN/MAN Committee of the IEEE Computer Society, "IEEE Standard for Information Technology—Telecommunications and information exchange between systems—Local and Metropolitan area networks—Specific requirements Part 11: Wireless LAN Medium Access Control (MAC) and Physical Layer (PHY) specifications: Amendment: Medium Access Control (MAC) Quality of Service (QoS) Enhancements", IEEE P802.11e/D13.0, Jan. 2005.

* cited by examiner

FIG.5

| PORT NUMBER | PORT STATUS |
|---|---|
| 1 | 1 |
| 2 | 0 |
| 3 | 0 |
| 4 | 0 |

FIG.6

| PORT NUMBER | TERMINAL MAC ADDRESS |
|---|---|
| 1 | MAC ADDRESS (1) |
| 2 | MAC ADDRESS (2) |
| 3 | MAC ADDRESS (3) |
| 4 | NO CONNECTION |

FIG.12

| TABLE ACQUISITION SOURCE MAC ADDRESS | TERMINAL TABLE | | | |
|---|---|---|---|---|
| | DATA (1) | DATA (2) | DATA (3) | DATA (4) |
| AP | NO CONNECTION | NO CONNECTION | NO CONNECTION | NO CONNECTION |
| STA (2) | MAC ADDRESS (1) | MAC ADDRESS (2) | MAC ADDRESS (3) | NO CONNECTION |
| STA (3) | MAC ADDRESS (11) | NO CONNECTION | NO CONNECTION | NO CONNECTION |
| STA (4) | MAC ADDRESS (21) | MAC ADDRESS (22) | NO CONNECTION | MAC ADDRESS (24) |
| NO ENTRY | NULL | NULL | NULL | NULL |
| NO ENTRY | NULL | NULL | NULL | NULL |

FIG.20

| HARDWARE TYPE | PROTOCOL TYPE | HARDWARE ADDRESS LENGTH | PROTOCOL ADDRESS LENGTH | CODE | TRANSMISSION MAC ADDRESS | TRANSMISSION IP ADDRESS | RECEPTION MAC ADDRESS | RECEPTION IP ADDRESS |
|---|---|---|---|---|---|---|---|---|
| 2 | 2 | 1 | 1 | 2 | 6 | 4 | 6 | 4 |

FIG.21

| MAC ADDRESS OF WIRELESS MASTER DEVICE | MAC ADDRESS OF WIRELESS SLAVE DEVICE | MAC ADDRESS OF TERMINAL THAT ISSUED ARP PACKET |
|---|---|---|
| 6 | 6 | 6 |

WIRELESS SLAVE UNIT

TECHNICAL FIELD

The present invention relates to a wireless slave device that, in a network area of a wireless network managed by a wireless master device, performs wireless network communication with another wireless slave device, and wired network communication with a terminal connected by wire to the wireless slave unit.

BACKGROUND ART

FIG. 24 shows an exemplary communication network constituted from a wireless master device, wireless slave devices, and terminals connected to the wireless slave devices by LAN (Local Area Network) cables.

A wireless master device 2600, which is also called an "access point," manages a wireless LAN in a network area 2604, and relays transfers of data between the wireless slave devices in the network area 2604.

The wireless master device 2600 also wirelessly receives wireless frames that have been wirelessly transmitted from the wireless slave devices, detects MAC (Media Access Control) addresses that are included in the wireless frames and belong to the wireless slave devices and terminals, and stores and manages a table including MAC addresses of wireless slave devices 2601 and 2602 in association with respective MAC addresses of terminals connected by wire to the wireless slave devices 2601 and 2602.

Note that in management of the table, the wireless master device 2600 deletes, from the table, MAC addresses that are not detected within a predetermined time period from a previous detection.

The wireless slave devices 2601 and 2602, which are also called "stations," can wirelessly exchange data with each other via the wireless master device 2600.

The wireless slave devices 2601 and 2602 also each include a wired hub function, and wired networks centered around the wireless slave devices can be constructed by connecting the terminals to the wireless slave devices with LAN cables.

Terminals 2611 to 2616 are specifically personal computers, AV devices or the like, and include LAN connection terminals. The terminals 2611 to 2613 are connected to the wireless slave device 2601 via LAN cables 2621 to 2623 respectively, and the terminals 2614 to 2616 are connected to the wireless slave device 2602 via LAN cables 2624 to 2626 respectively.

The terminals 2611 to 2616 can exchange data with each other via the wireless slave devices 2601 and 2602 and the wireless master device 2600.

Wired communication between the wireless slave device 2601 and the terminals 2611 to 2613, and between the wireless slave device 2602 and the terminals 2614 to 2616 conforms to the IEEE (Institute of Electrical and Electronic Engineers) 802.3 standard. Also, wireless communication between the wireless master device 2600 and the wireless slave devices 2601 and 2602 conforms to the IEEE 802.11 standard.

The following is a brief description of operations performed by each of the devices when the terminal 2611 connected by wire to the wireless slave device 2601 transmits a frame to the terminal 2614 connected by wire to the wireless slave device 2602.

The frame transmitted by the terminal 2611 includes the MAC address thereof indicating the transmission source, the MAC address of the terminal 2614 indicating the transmission destination, and the MAC addresses of the wireless slave stations 2601 and 2602 performing relaying.

Upon detecting the frame transmitted from the terminal 2611, the wireless slave device 2601 checks the availability of a wireless channel, and if the wireless channel is open, converts the frame to a wireless frame, and wirelessly transmits the wireless frame to the wireless master device 2600.

Upon receiving the wireless frame that was wirelessly transmitted from the wireless slave device 2601 and is addressed to the terminal 2614, the wireless master device 2600 reads the MAC addresses included in the wireless frame, and references the managed table.

If a MAC address matching the MAC address of the terminal 2614, which is the transmission destination, is stored in the table in association with the MAC address of the wireless slave device 2602, the wireless master device 2600 wirelessly transmits the wireless frame to the wireless slave device 2602. If the MAC address of the terminal 2614 is not stored in the table, the wireless master device 2600 discards the wireless frame.

Upon wirelessly receiving the wireless frame that was wirelessly transmitted from the wireless master device 2600, the wireless slave device 2602 converts the wireless frame to a wire frame, and transmits the wire frame by wire.

Japanese Patent Application Publication No. 2002-94516 (pages 4 to 7, FIG. 2 and FIG. 8) discloses the aforementioned operations performed by the devices.

SUMMARY OF THE INVENTION

Problems Solved by the Invention

However, in the aforementioned communication network, the terminal 2614 that was connected to the wireless slave device 2602 may be disconnected when the terminal 2611 transmits the frame to the terminal 2614. For example, if the terminal 2614 is a notebook computer, a user may not necessarily have the terminal 2614 constantly connected to the wireless slave device 2602 by the LAN cable 2624.

In this case, since the wireless slave device 2601 does not know that the terminal 2614 is disconnected, the wireless slave device 2601 checks the availability of a wireless channel, and if the wireless channel is open, converts the frame to a wireless frame and transmits the wireless frame to the wireless master device 2600, similarly to as mentioned above.

Also, if the MAC address of the terminal 2614 has not been deleted from the managed table, the wireless master device 2600 that received the wireless frame transmitted from the wireless slave device 2601 transmits the wireless frame to the wireless slave device 2602.

In other words, needless wireless communication is performed regardless of the fact that the terminal 2614 is disconnected.

Wireless communication in a wireless-wired LAN communication network readily becomes bottlenecked due to wireless LANs having a slower communication speed than wired LANs, whereby there is demand to suppress needless wireless communication such as has been mentioned above.

An aim of the present invention is therefore to provide a wireless slave device capable of suppressing needless wireless communication that occurs in communication between terminals which are connected by wire to different wireless slave devices.

Means to Solve the Problems

The aim of the present invention is achieved by a wireless slave device for performing, in a network area of a wireless network managed by a wireless master device, wired network communication with one or more terminals connected by wire to the wireless slave device, and wireless network communication with another wireless slave device connected by wire to one or more other terminals, the wireless slave device including: a wireless reception unit operable to wirelessly receive a notification frame that includes a respective MAC address of each of the one or more other terminals; a storage unit operable to store the MAC addresses of the one or more other terminals, which are included in the wirelessly received notification frame; a wire reception unit operable to receive by wire a frame that includes a transmission destination MAC address and has been transmitted from one of the terminals connected by wire to the wireless slave device; and a filtering unit operable to discard the frame if the transmission destination MAC address in the frame received by wire does not match any of the MAC addresses stored in the storage unit.

Effects of the Invention

According to the wireless slave device having the above structure, in the case of the terminal connected to the wireless slave device by wire transmitting a frame to a terminal connected by wire to another wireless slave device, the transmission destination terminal is considered to not be connected by wire to the other wireless slave device if the MAC address of the transmission destination terminal is not stored in the storage unit, and the frame is discarded without being wirelessly transmitted, thereby enabling the suppression of needless wireless communication.

Here, the wireless slave device may further include a first control unit operable to, in accordance with a notification frame newly wirelessly received by the wireless reception unit, update the MAC addresses stored in the storage unit; a second storage unit operable to store a MAC address of one of the terminals connected by wire to the wireless slave device, which is included in the frame that the wire reception unit received by wire; a second control unit operable to, in accordance with a predetermined condition, delete the MAC address stored in the second storage unit; a notification frame creation unit operable, if the MAC address has been deleted from the second storage unit, or if a MAC address has been newly stored in the second storage unit, to create a notification frame including all of the MAC addresses currently stored in the second storage unit; and a wireless transmission unit operable to wirelessly transmit the created notification frame to the other wireless slave device.

According to this structure, MAC addresses reflecting a newest wire connection status of the other wireless slave device are stored in the storage unit, thereby suppressing needless wireless communication to a disconnected terminal. Needless wireless communication between the other wireless slave device and the wireless master device can also be suppressed since the wireless slave device notifies, to the other wireless slave device, its newest connection status of terminals connected thereto by wire.

Here, the wireless slave device may further include a request frame creation unit operable to create a request frame for requesting the other wireless slave device to transmit the notification frame; and a wireless transmission unit operable to wirelessly transmit the created request frame to the other wireless slave device, the wireless reception unit wirelessly receiving the notification frame wirelessly transmitted from the other wireless slave device according to the wirelessly transmitted request frame.

According to this structure, the wireless slave device creates and wirelessly transmits a request frame to the other wireless slave device when it is necessary to know the connection status of terminals connected by wire to the other wireless slave device, thereby enabling the suppression of needless wireless transmission of notification frames.

Here, the request frame creation unit may create the request frame addressed to the other wireless slave device after a predetermined time period has elapsed from the wireless reception unit wirelessly receiving the notification frame wirelessly transmitted from the other wireless slave device. In other words, periodically creating and wirelessly transmitting the request frame to the other wireless slave device enables the suppression of unnecessary wireless communication between the other wireless slave device and the wireless master device.

Here, the wireless reception unit may wirelessly receive the request frame wirelessly transmitted from the other wireless slave device, and the wireless slave device may further include a second storage unit operable to store a MAC address of one of the terminals connected by wire to the wireless slave device, which is included in the frame that the wire reception unit received by wire; and a notification frame creation unit operable, if the request frame is wirelessly received, to create a notification frame including all of the MAC address stored in the second storage unit.

According to this structure, the wireless slave device wirelessly transmits the notification frame to the other wireless slave device according to the request frame transmitted from the other wireless slave device, thereby enabling the suppression of needless wireless transmission of notification frames.

Here, the notification frame wirelessly received by the wireless reception unit may be an ARP packet having been attached with attachment information that includes the MAC addresses of the one or more other terminals connected by wire to the other wireless slave device.

This structure enables the wireless slave device to use an ARP packet, which is a known protocol, to notify the MAC addresses of terminals connected thereto by wire to the other wireless slave device.

Here, the wire reception unit may receive by wire an ARP packet that has been transmitted from one of the terminals connected by wire to the wireless slave device and is addressed to one of the other terminals connected by wire to the other wireless slave device, and the wireless slave device may further include an attaching unit operable to attach, to the ARP packet, attachment information including all of the MAC addresses stored in the second storage unit; and a wireless transmission unit operable to wirelessly transmit the ARP packet having been attached with the attachment information. Also, the wireless network managed by the wireless master device may conform to IEEE 802.11e standards, and the wireless slave device may further include a setting unit operable, if the transmission destination MAC address in the frame that the wire reception unit received by wire matches any of the MAC addresses stored in the storage unit, to perform setting for direct wireless communication between the wireless slave device and the other wireless slave device without involving the wireless master device.

Also, a wireless slave device of the present invention is for performing, in a network area of a wireless network managed by a wireless master device, wired network communication with one or more terminals connected by wire to the wireless slave device, and wireless network communication with another wireless slave device connected by wire to one or more other terminals, the wireless slave device including a wireless reception unit operable to wirelessly receive a notification frame that includes a respective MAC address of each of the one or more terminals that has been disconnected from the other wireless slave device after having been connected thereto by wire; a storage unit operable to store the MAC addresses included in the wirelessly received notification frame; a wire reception unit operable to receive by wire a frame that has been transmitted from one of the terminals connected by wire to the wireless slave device and includes a transmission destination MAC address; and a filtering unit operable to discard the frame if the transmission destination MAC address in the frame received by wire matches any of the MAC addresses stored in the storage unit.

According to this structure, in the case of the terminal connected by wire to the wireless slave device transmitting a frame to a terminal connected by wire to another wireless slave device, the transmission destination terminal is considered to not be connected by wire to the other wireless slave device if the MAC address of the transmission destination terminal is stored in the storage unit, and the frame is discarded without being wirelessly transmitted, thereby enabling the suppression of needless wireless communication.

Here, the wireless slave device may further include a second storage unit operable to store a respective MAC address of each of the one or more terminals connected by wire to the wireless slave device, which are included in the frame that the wire reception unit received by wire; a detection unit operable to detect that one or more of the terminals connected by wire to the wireless slave device has been disconnected; a notification frame creation unit operable to create a notification frame that includes, from among the MAC addresses stored in the second storage unit, the MAC address of the one or more terminals whose disconnection has been detected by the detection unit; and a wireless transmission unit operable to wirelessly transmit the created notification frame to the other wireless slave device.

According to this structure, the wireless slave device notifies the other wireless slave device of terminals that had been connected by wire but then disconnected, thereby enabling the suppression of needless wireless communication between the other wireless slave device and the wireless master device.

BRIEF DESCRIPTION OF THE DRAWINGS

FIG. 5 shows data handled by a port status storage unit 141;
FIG. 6 shows exemplary table content of table data stored by a first table storage unit 125;
FIG. 12 shows exemplary content of table data stored by a second table storage unit 112;
FIG. 20 shows a data structure of an ARP packet;
FIG. 21 shows a data structure of connection information.

Figure 1:
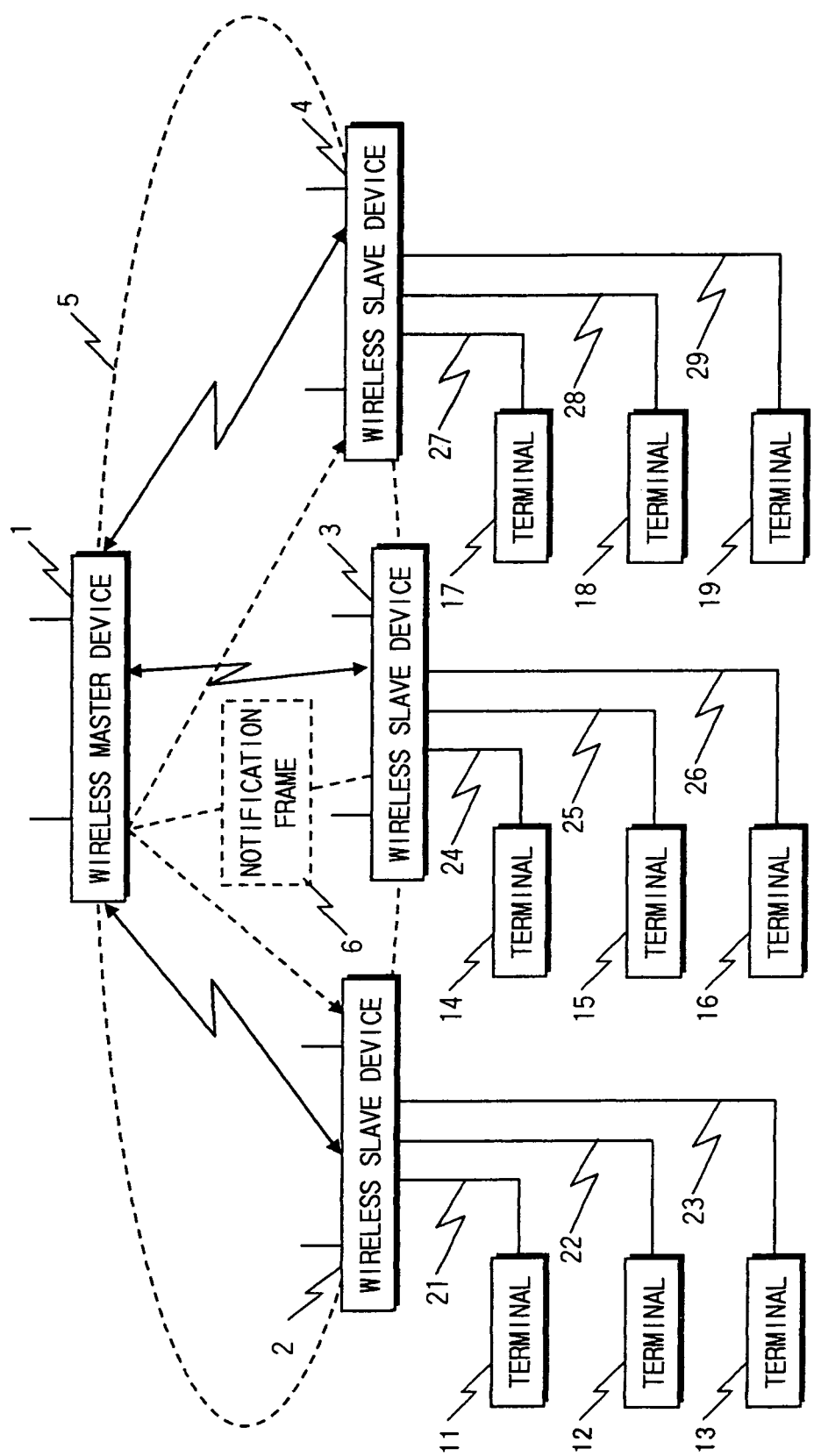
FIG. 1 shows an exemplary communication network including wired networks and a wireless network.

DESCRIPTION OF THE CHARACTERS 1, 2600 wireless master device
2 to 4, 2A to 4A, 3B wireless slave device
21 to 29, 2621 to 2626 LAN cable
11 to 19, 2611 to 2616 terminal
5, 2604 network area
6 notification frame
7 request frame
110 second table control unit
111 filtering unit
112 second table storage unit
120 wire transmission/reception unit
121 wireless transmission/reception unit
122 wireless frame conversion unit
123 frame conversion unit
124 acquisition unit
125 first table storage unit
126 first table control unit
127, 127A notification unit
128 antenna
129 notification frame acquisition unit
130a to 130d IO (input/output) port
131a to 131d PHY/MAC processing unit
132 switch control unit
133 MAC processing unit
134, 147 to 149, 164 to 167, 186 to 188, 214, 235 to 238, 256, 258, 259, 337 to 339 input terminal
135 to 137, 150 to 152, 168, 169, 189, 190, 215 to 217, 239, 240, 257, 260, 340 output terminal
140 connection detection unit
141 port status storage unit
142 registration control unit
143 transmission source address acquisition unit
144 registration information notification unit
145 disconnection detection unit
146 deletion information notification unit
160 memory address conversion unit
161, 232 write processing unit
162 memory address issuing unit
163, 234 read processing unit
175 notification frame identification information
176 management information
177 terminal data table
180 to 182, 332, 333 delay circuit 183, 334 identification information creation unit
184, 335 management information creation unit
185, 336 notification frame creation unit
213, 255 switch
230 memory address management unit
231 write-to address issuing unit
233 read-from address issuing unit
250 buffer control unit
251 buffer
252 destination address acquisition unit
253 comparison unit
254 transmission control unit
311 request frame creation unit
320 request frame identification information
321 request source MAC address
322 notification frame identification information
323 disconnected terminal MAC address
330 request frame detection unit
400 connection information analysis unit
401 connection information attaching unit
402 connection information storage unit
403 packet identification unit
404 bandwidth setting packet processing unit
405 wireless link setting management unit
406 direct link judgment unit

DETAILED DESCRIPTION OF THE INVENTION

Embodiments of the present invention are described below with reference to the drawings.

Embodiment 1

Overview

FIG. 1 shows an exemplary communication network constituted from a wireless master device, wireless slave devices, and terminals connected to the wireless slave devices by LAN cables.

A wireless master device 1 is the same as the wireless master device 2600 mentioned in Background Art.

Wireless slave devices 2, 3 and 4 can exchange data with each other via the wireless master device 1.

The wireless slave devices 2, 3 and 4 also each include a wired hub function, and wired networks centered around the wireless slave devices can be constructed by connecting the terminals to the wireless slave devices with LAN cables.

Terminals 11 to 19 are specifically personal computers, AV devices or the like, and include LAN connection terminals.

The terminals 11 to 13 are connected to the wireless slave device 2 via LAN cables 21 to 23, the terminals 14 to 16 are connected to the wireless slave device 3 via LAN cables 24 to 26, and the terminals 17 to 19 are connected to the wireless slave device 3 via LAN cables 27 to 29.

The terminals 11 to 19 can exchange data with each other via the wireless slave devices 2, 3 and 4 and the wireless master device 1.

Wired communication between the wireless slave device 2 and the terminals 11, 12 and 13, between the wireless slave device 3 and the terminals 14, 15 and 16, and between the wireless slave device 4 and the terminals 17, 18 and 19 conforms to the IEEE 802.3 standard. Also, wireless communication between the wireless master device 1 and the wireless slave devices 2 to 4 conforms to the IEEE 802.11 standard.

The following briefly describes an overview of operations performed by the wireless slave devices.

Upon receiving frames from terminals connected by wire, the wireless slave devices acquire MAC addresses of the terminals included in the received frames. The wireless slave devices store the acquired MAC addresses in respectively provided first table storage units.

When a terminal connected to one of the wireless slave devices by wire is disconnected, the wireless slave device deletes the MAC address of the disconnected terminal from the first table storage unit.

Upon updating storage content of the first table storage units, the wireless slave devices create notification frames including their own MAC address and stored terminal MAC addresses, and wirelessly transmit the notification frames to the other wireless slave devices.

The notification frames wirelessly transmitted by the wireless slave devices are wirelessly received by the other wireless slave devices via the wireless master device 1.

The wireless slave devices associate and store, in second table storage units, the MAC addresses of the other wireless slave devices and the terminals.

The wireless slave devices include filtering units that, upon receiving a frame transmitted from a terminal connected by wire, reference the second table storage unit, and discard the frame if a destination of the frame does not match the MAC address of a terminal connected by wire to another wireless slave device.

Figure 2:
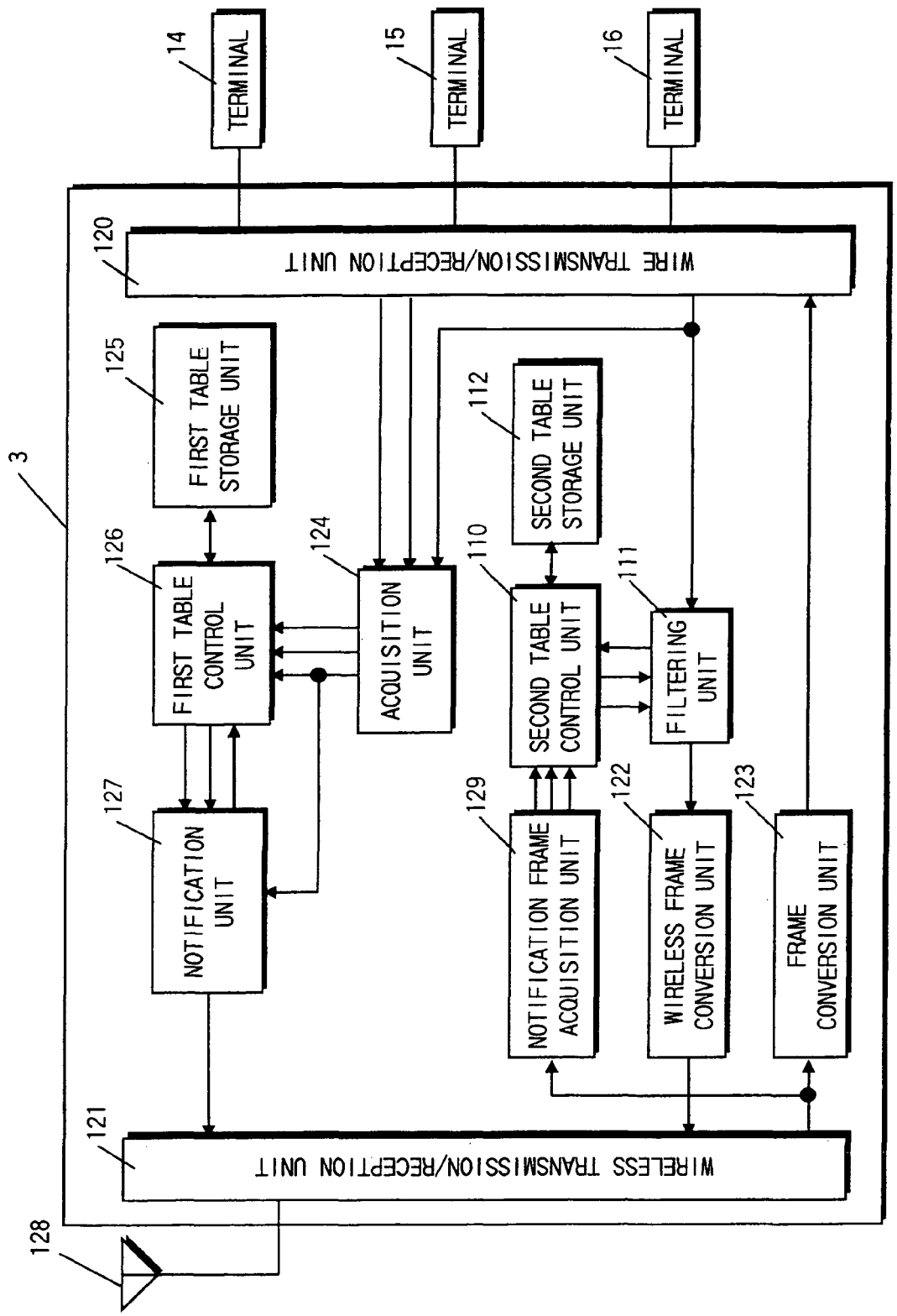
FIG. 2 shows a structure of a wireless slave device 3 according to embodiment 1.

FIG. 2 shows a functional structure of the wireless slave device 3.

Descriptions of the wireless slave devices 2 and 4 have been omitted since they have the same structure as the wireless slave device 3.

The wireless slave device 3 includes a wire transmission reception unit 120, a wireless transmission reception unit 121, a wireless frame conversion unit 122, a frame conversion unit 123, an acquisition unit 124, a first table storage unit 125, a first table control unit 126, a notification unit 127, an antenna 128, a notification frame acquisition unit 129, a second table control unit 110, a filtering unit 111, and a second table storage unit 112.

The wire transmission/reception unit 120 performs IEEE 802.3-compliant PHY (Physical Layer)/MAC (Media Access Control) processing on wire frames received from the terminals 14 to 16, and outputs the post-processing frames to the wireless frame conversion unit 122 and the acquisition unit.

The wire transmission/reception unit 120 also inputs frames from the frame conversion unit 123, performs IEEE 802.3-compliant PHY/MAC processing on the input frames, and transmits the post-processing frames to the terminals 14 to 16.

Figure 3:
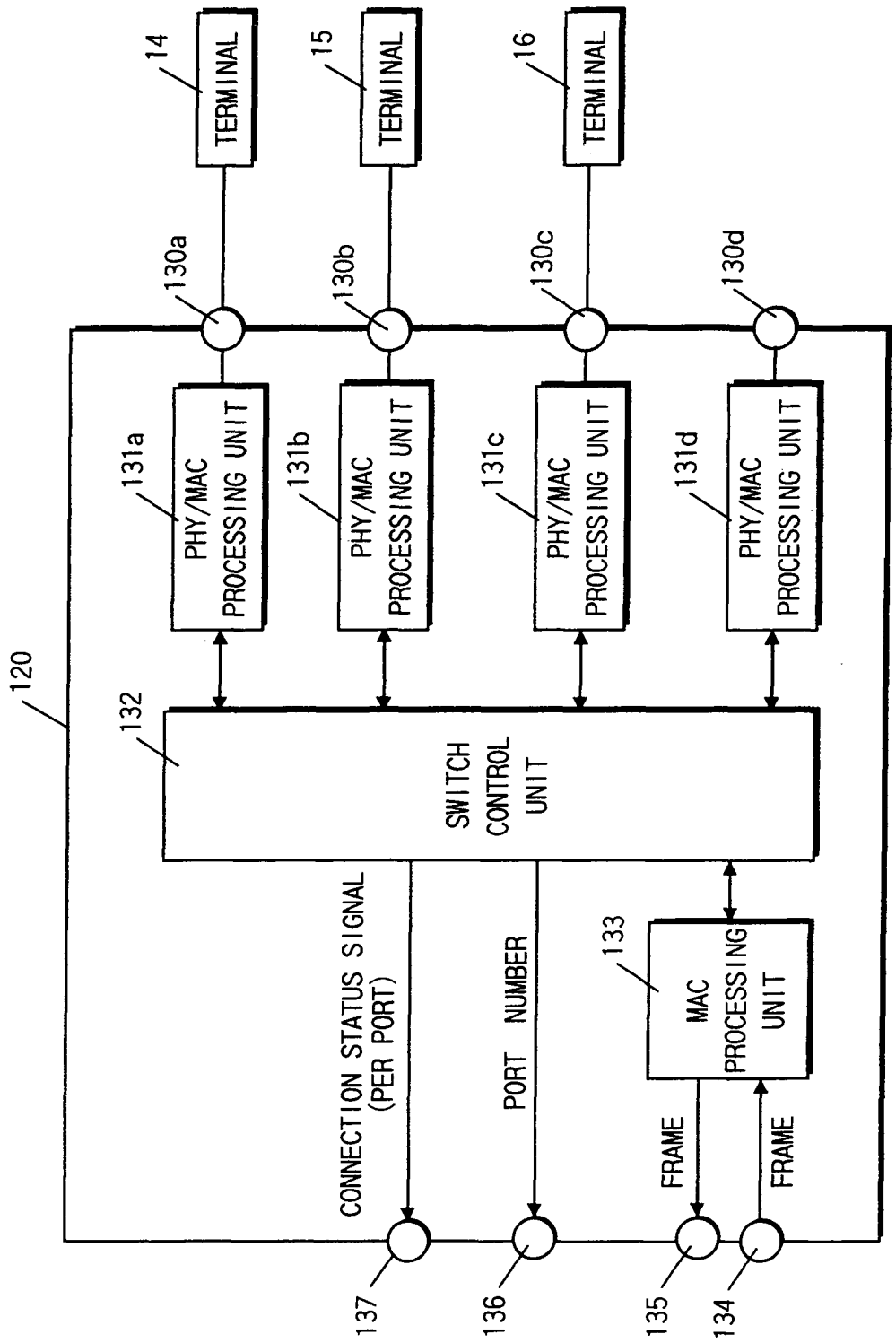
FIG. 3 shows a structure of a wire transmission/reception unit 120.

The following is a detailed description of operations performed in the wire transmission/reception unit 120, with reference to FIG. 3.

Wire Transmission/Reception Unit 120

FIG. 3 shows a structure of the wire transmission/reception unit 120.

As shown in FIG. 3, the wire transmission/reception unit 120 includes IO (input/output) ports 130a to 130d which are connection I/Fs, PHY/MAC processing units 131a to 131d, a switch control unit 132, a MAC processing unit 133, an input terminal 134, and output terminals 135 to 137.

The PHY/MAC processing unit 131a receives an input of a wire frame received from the terminal 14 via the IO port 130a, performs IEEE 802.3-compliant PHY/MAC processing on the input wire frame, and outputs an internal processing frame to the switch control unit 132.

The internal processing frame includes data as well as information regarding a transmission source MAC address, a destination MAC address, and the like.

The PHY/MAC processing unit 131a also receives an input of an internal processing frame output from the switch controlling unit 132, performs IEEE 802.3-compliant PHY/MAC processing, and transmits the post-processing frame to the terminal 14 via the IO port 130a.

Upon receiving an input of the internal processing frame output from the PHY/MAC processing unit 131a, the switch control unit 132 relays the internal processing frame to the PHY/MAC processing units 131b to 131d and the MAC processing unit 133.

While relaying the internal processing frame, the switch control unit 132 outputs, to the output terminal 136, a port number indicating that the internal processing frame has been input from the IO port 130a. The switch control unit 132 also outputs, to the output terminal 137, a connection status signal indicating a connection status of the IO ports 130a to 130d.

The connection status signal is a signal for determining the individual connection statuses of the IO ports 130a to 130d.

The MAC processing unit 133 creates a MAC frame (hereinafter, simply called "frame") from the internal processing frame relayed by the switch control unit 132, and outputs the created frame to the output terminal 135.

The MAC processing unit 133 also receives an input of the frame input from the input terminal 134, and outputs the internal processing frame to the switch control unit 132.

As a result of the above operations, the wire transmission/reception unit 120 transmits and receives wired frames.

The following describes other functional units, with reference to FIG. 2.

The wireless frame conversion unit 122 converts an input frame to an IEEE 802.11-compliant wireless frame, and outputs the wireless frame to the wireless transmission/reception unit 121.

The wireless transmission/reception unit 121 performs digital modulation on the wireless frame input from the wireless frame conversion unit 122 to convert the wireless frame to transmission signals in a frequency band for wireless transmission, and wirelessly transmits the wireless signals via the antenna 128.

The wireless transmission/reception unit 121 also receives an input of wireless signals wirelessly received via the antenna 128, demodulates the input wireless signals, and outputs a wireless frame to the frame conversion unit 123 and the notification frame acquisition unit 129.

The wireless frame input by the wireless transmission/reception unit 121 is converted to a wire frame by the frame conversion unit 123, and input to the wire transmission/reception unit 120.

The acquisition unit 124 receives an input of the frame, the port number, and the connection status signal all output from the wire transmission/reception unit 120.

The acquisition unit 124 uses the input frame, port number and connection status signal to output update information (port number and update data) and an update request signal.

The following is a detailed description of operations performed in the acquisition unit 124.

Figure 4:
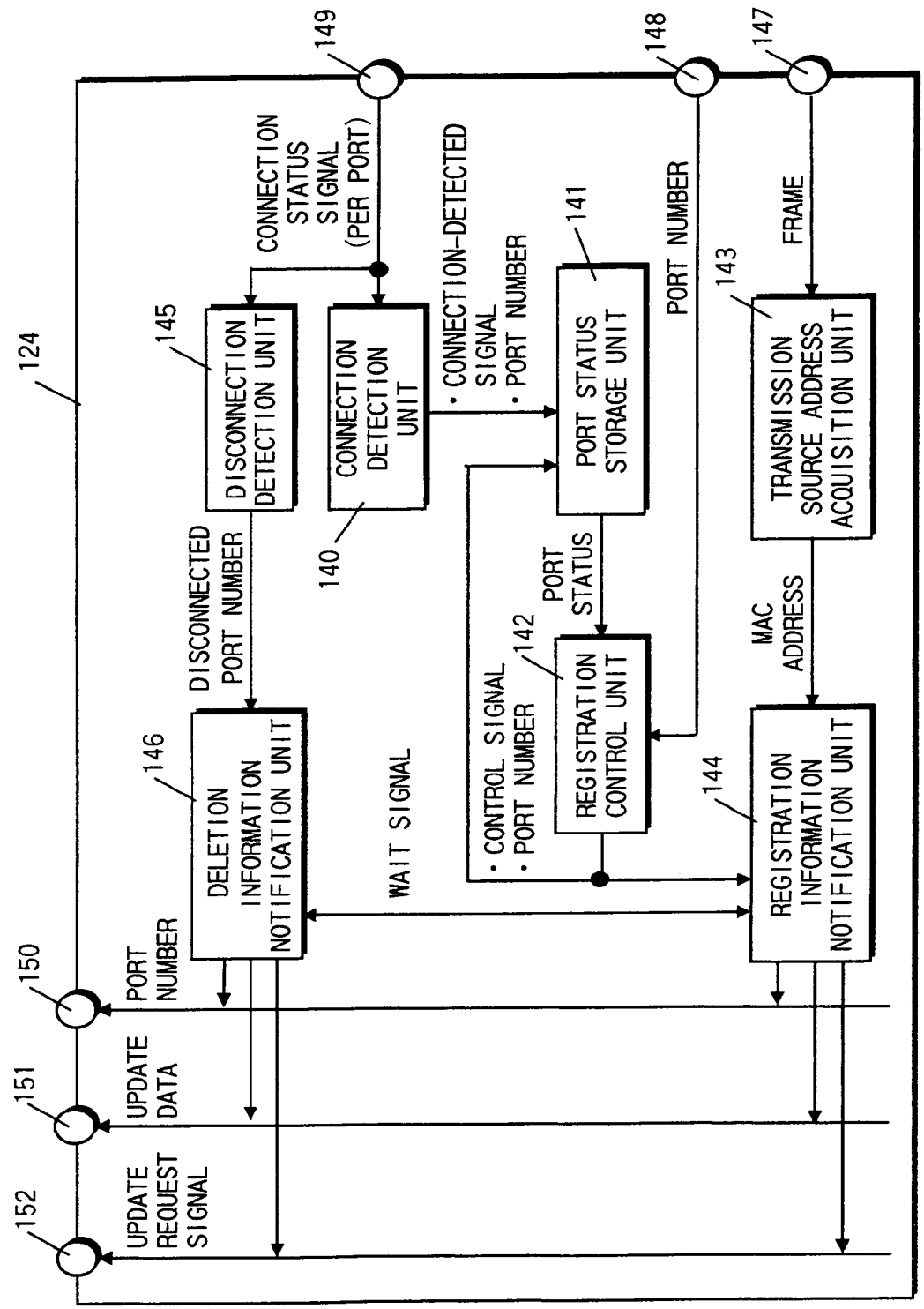
FIG. 4 shows a structure of an acquisition unit 124.

FIG. 4 shows a structure of the acquisition unit 124.

As shown in FIG. 4, the acquisition unit 124 includes a connection detection unit 140, a port status storage unit 141, a registration control unit 142, a transmission source address acquisition unit 143, a registration information notification unit 144, a disconnection detection unit 145, a deletion information notification unit 146, input terminals 147 to 149, and output terminals 150 to 152.

The connection detection unit 140 receives an input of the connection status signal from the input terminal 149, and detects new connections to the IO ports 130a to 130d of the wire transmission/reception unit 120 with use of the input connection status signal.

For example, if disconnection is defined as "0", and connection is defined as "1" in the status connection signal, a new connection can be detected by detecting a change from "0" to "1".

Upon detecting a new connection to one of the IO ports 130a to 130d, the connection detection unit 140 outputs, to the port status storage unit 141, a connection-detected signal and the port number of the IO port 130a to 130d for which the new connection has been detected.

The port status storage unit 141 receives an input of the port number and connection-detected signal output from the connection detection unit 140, and stores the connection status of the IO ports 130a to 130d of the wire transmission/reception unit 120.

Figure 5:
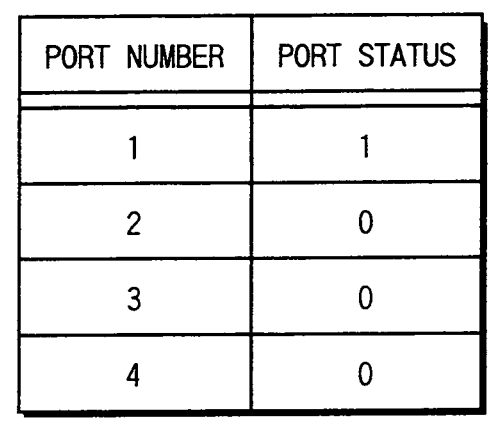

Specifically, the port numbers of the IO ports 130a to 136d and the port statuses are stored in association as shown in FIG. 5.

The port statuses have a value of "0" or "1".

A value of "1" indicates a new connection status, and a value of "0" indicates all other statuses.

The port status storage unit 141 also transitions the port status values depending on two types of input signals. One of the input signal types is the connection-detected signal input by the connection detection unit 140, and the other input signal type is a control signal input by the registration control unit 142.

Upon confirming input of the connection-detected signal, the port status storage unit 141 transitions the port status associated with the port number inputted from the connection detection unit 140 to "1".

Upon confirming input of "1" as the control signal, the port status storage unit 14 also transitions the port status associated with the port number input from the registration control unit 142 to "0".

Furthermore, the port status storage unit 141 outputs the stored port statuses for the port numbers to the registration control unit 142.

The registration control unit 142 receives an input of the port numbers from the input terminal 148, and the port statuses from the port status storage unit 141, creates control signals from the input port numbers and port statuses, and outputs the port numbers and the created control signals.

If the port status for an input port number is, "1", the registration control unit 142 outputs a "1" signal instructing execution of processing, and if the port status for an input port number is "0", the registration control unit 142 outputs a "0" signal instructing processing to not be executed.

The port numbers and control signals output by the registration control unit 142 are input by the registration information notification unit 144 and the port status storage unit 141.

At the same time as the registration control unit 142 outputs the port numbers and the control signals, the transmission source address acquisition unit 143 acquires a transmission source MAC address from the frame input from the input terminal 147, and outputs the acquired MAC address to the registration information notification unit 144.

The registration information notification unit 144 receives an input of the controls signals and port numbers output from the registration control unit 142, and the MAC address output from the transmission source address acquisition unit 143.

If the control signal input from the registration control unit 142 is "1", the registration information notification unit 144 outputs, to the output terminal 150, the port number input from the registration control unit 142, outputs, to the output terminal 151, the MAC address input from the transmission source address acquisition unit 143 as update data, and outputs an update request signal to the output terminal 152.

The disconnection detection unit 145 receives an input of the connection status signals from the input terminal 149, and detects the disconnection of a terminal that had been connected to one of the IO ports 130a to 130d of the wire transmission/reception unit 120, with use of the input connection status signals.

For example, the disconnection detection unit 145 can detect a disconnection by detecting that the connection status signal has changed from "1" to "0".

Upon detecting a disconnection, the disconnection detection unit 145 outputs, to the deletion information notification unit 146, the port number of the IO port 130a to 130d for which disconnection has been detected, as a disconnected port number.

Upon receiving an input of the disconnected port number output from the disconnection detection unit 145, the deletion information notification unit 146 outputs the input disconnected port number to the output terminal 150, outputs data defined as "unconnected" to the output terminal 151 as update data, and outputs an update request signal to the output terminal 152.

Note that a wait signal is transmitted/received between the registration information notification unit 144 and the deletion information notification unit 146 such that the units 144 and 146 do not perform processing at the same time.

Before performing processing, the registration information notification unit 144 and the deletion information notification unit 146 check whether the wait signal is being received. If the wait signal is not being received, the registration information notification unit 144 and the deletion information notification unit 146 perform processing and transmit the wait signal during the processing. If the reception of the wait signal is being received before performing processing, the registration information notification unit 144 and the deletion information notification unit 146 wait until reception of the wait signal has ended.

After reception of the wait signal has ended, the registration information notification unit 144 or the deletion information notification unit 146 performs processing and transmits the wait signal during the processing.

As a result of the above operations, the acquisition unit 124 uses the input frame, port numbers and connection status signals to output update information (port number and update data) and the update request signal to the first table control unit 126. The update request signal is also output to the notification unit 127.

The first table control unit 126 receives an input of the port number, update data and update request signal output from the acquisition unit 124, and upon detecting the input of the update request signal, performs writing to the table storage unit 125 based on the same input port number and update data.

The first table storage unit 125 stores, for example, table data expressing a table such as is shown in FIG. 6.

FIG. 6 shows exemplary table content of table data stored in the first table storage unit 125.

The table shown in FIG. 6 is constituted from port numbers and terminal MAC addresses, where the port numbers are associated with the IO ports 130a to 130d of the wire transmission/reception unit 120, and the MAC address of terminal connected to the IO ports 130a to 130d are recorded as the terminal MAC addresses.

Also, data defined as "no connection" is recorded when no connection exists.

Specifically, in the first table storage unit 125, memory addresses and memory areas for storing MAC addresses are allocated to the port numbers, and the first table storage unit 125 stores the MAC addresses of terminals connected to the IO ports 130a to 130d in the memory areas.

Also, the first table control unit 126 receives an input of the data request signal output from the notification unit 127, and upon detecting the input of the data request signal, sequentially reads the MAC addresses stored in the first table storage unit 125, outputs the read MAC addresses as table data, and outputs an output commencement signal upon commencing the output of the table data.

Figure 7:
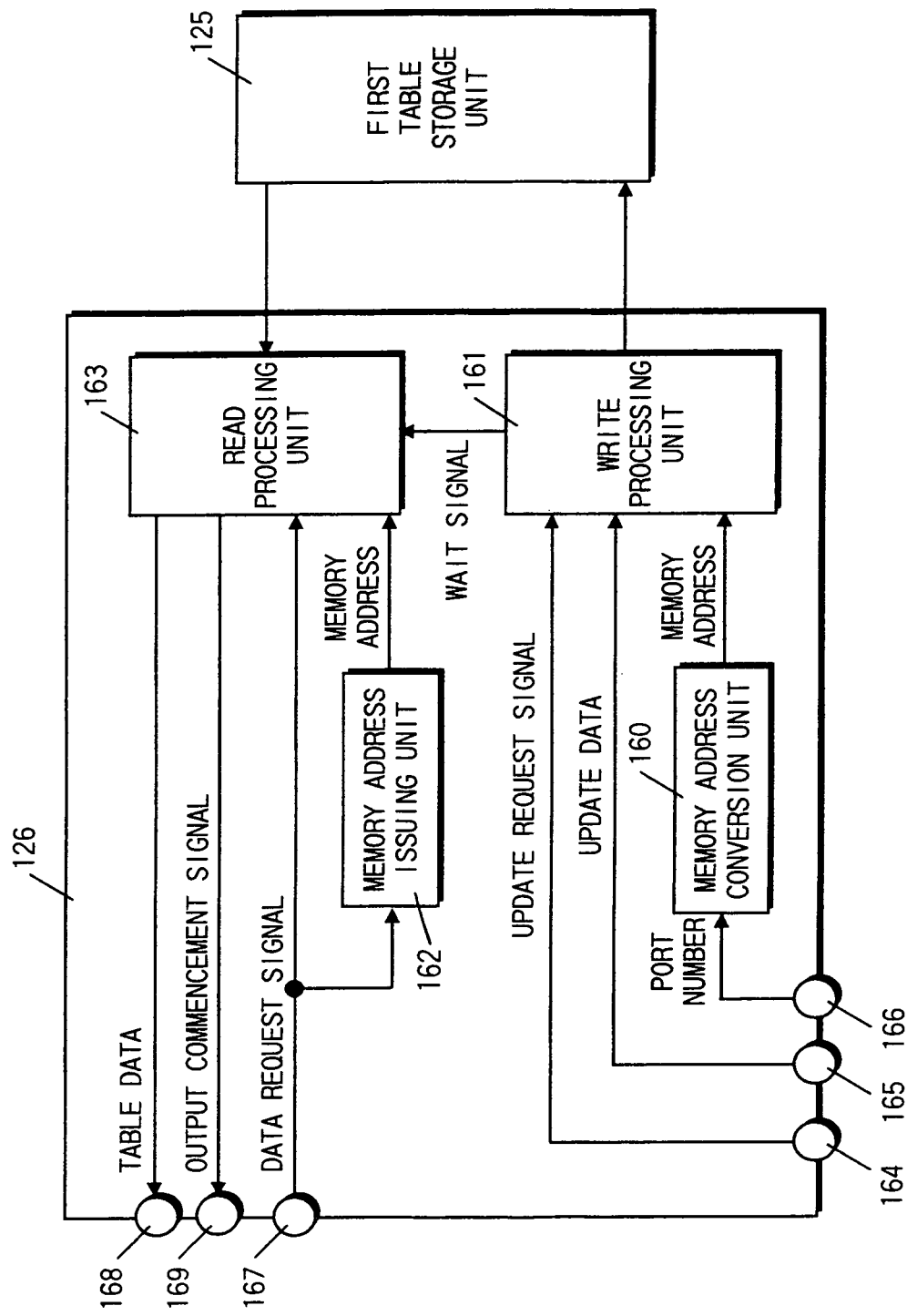
FIG. 7 shows a structure of a first table control unit 126.

The following is a detailed description of operations performed in the first table control unit 126, with reference to FIG. 7.

FIG. 7 shows a structure of the first table control unit 126.

As shown in FIG. 7, the first table control unit 126 includes a memory address conversion unit 160, a write processing unit 161, a memory address issuing unit 162, a read processing unit 163, input terminals 164 to 167, and output terminals 168 and 169. Also, the first table control unit 126 and the first table storage unit 125 are connected via a bus which is not depicted.

The memory address conversion unit 160 receives an input of a port number from the input terminal 166, and outputs, for the input port number, a memory address allocated to the port number in the table storage unit 125. The memory address output by the memory address conversion unit 160 is input to the write processing unit 161.

The write processing unit 161 receives an input of the update request signal from the input terminal 164, the update data from the input terminal 165, and the memory address from the memory address conversion unit 160, and upon detecting the input update request signal, writes the update data to the same input memory address in the first table storage unit 125.

The table storage unit 126 performs writing to the first table storage unit 125 by the above operations performed by the memory address conversion unit 160 and the write processing unit 161.

The memory address issuing unit 162 receives an input of the data request signal from the input terminal 167, and upon detecting the data request signal, outputs, to the read processing unit 163, the memory addresses allocated to all of the port numbers in the first table storage unit 125.

The read processing unit 163 receives an input of the data request signal from the input terminal 164 and the memory addresses from the memory address issuing unit 162, and upon detecting the data request signal, sequentially reads the data at the memory addresses input from the memory address issuing unit 162, outputs the read data to the output terminal 168 as table data after the reading is complete, and outputs an output commencement signal to the output terminal 169 upon commencing the output of the table data.

The first table control unit 126 performs reading from the first table storage unit 125 by the above operations performed by the memory address issuing unit 162 and the read processing unit 163.

Note that the write processing unit 161 outputs the wait signal to the read processing unit 163 while executing write processing. The read processing unit 163 suspends the reading of data from the first table storage unit 125 while the wait signal is being input. In this way, reading from and writing to the first table storage unit 125 are not performed at the same time.

The table data and output commencement signal output from the first table control unit 126 are input to the notification unit 127.

The notification unit 127 receives an input of the update request signal output from the acquisition unit 124, creates a data request signal from the input update request signal, and outputs the created data request signal to the first table control unit 126.

The notification unit 127 also receives an input of the table data and the output commencement signal output from the first table control unit 126, and upon detecting the output commencement signal, creates a notification frame including content of the table data, and outputs the created notification frame to the wireless transmission/reception unit 121.

Figure 8:
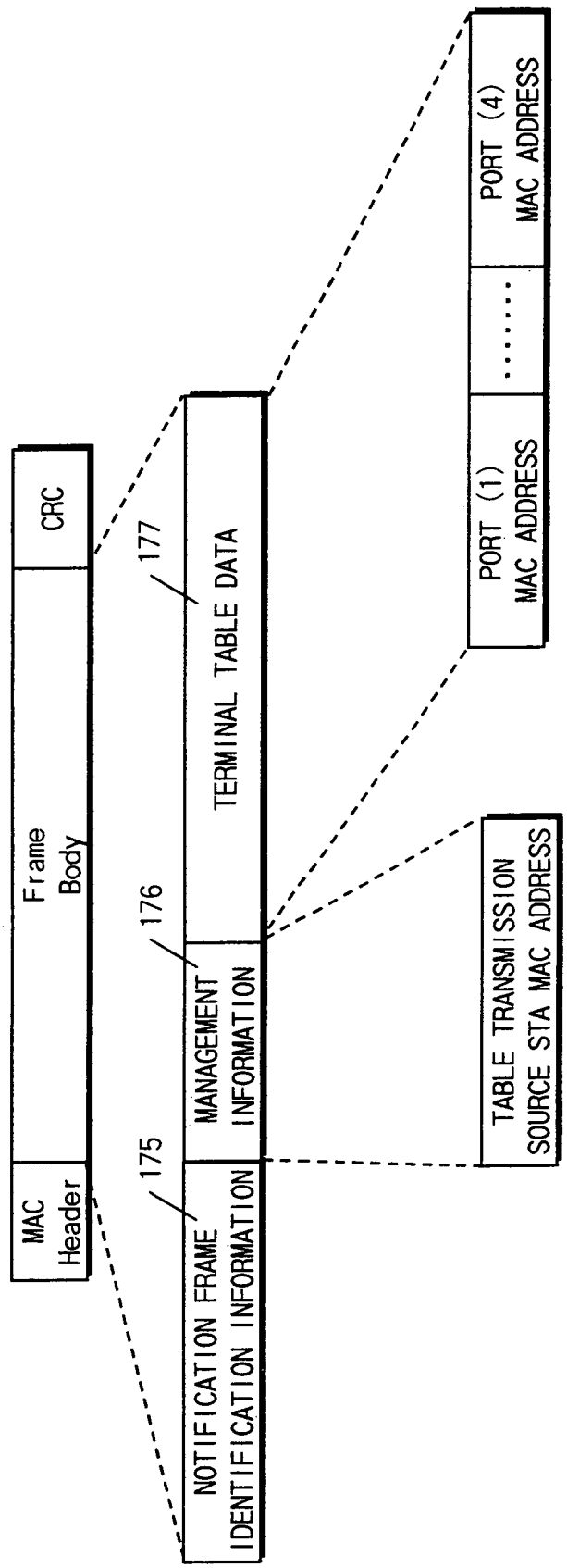
FIG. 8 shows a structure of a communication frame created by a notification unit 127.

FIG. 8 shows a structure of the notification frame created by the notification unit 127.

The notification frame has a frame format conforming to the IEEE 802.11 standard, and a destination MAC address is set to a broadcast address.

A frame body storing data is constituted from notification frame identification information 175, management information 176 and terminal table data 177.

The notification frame identification information 175 is data of a fixed length, and includes data that enables identification of the frame as a notification frame.

The management information 176 is data of a fixed length, and includes the MAC address of the wireless slave device 3.

The terminal table data 177 is data of a fixed length, and includes the MAC address of all of the port numbers in order from port number "1".

The wire transmission/reception unit 120 has the four IO ports 130a to 130d, and can have four MAC addresses.

Figure 9:
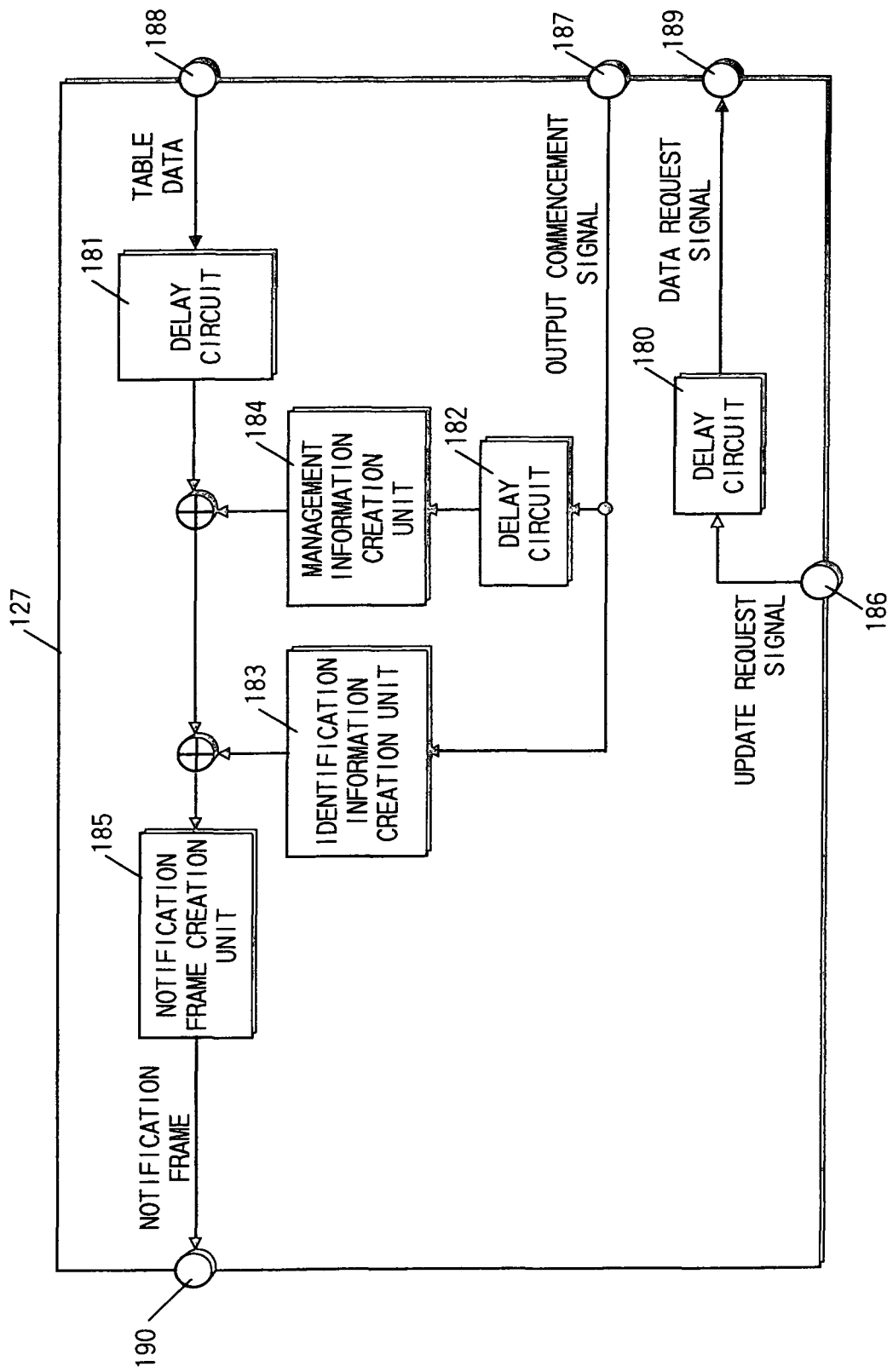
FIG. 9 shows a structure of the notification unit 127.

The following is a detailed description of operations performed in the notification unit 127, with reference to FIG. 9.

FIG. 9 shows a structure of the notification unit 127.

As shown in FIG. 9, the notification unit 127 includes delay circuits 180 to 182, an identification information creation unit 183, a management information creation unit 184, a notification frame creation unit 185, input terminals 186 to 188, and output terminals 189 and 190.

The delay circuit 180 receives an input of the update request signal from the input terminal 186, delays the input update request signal, and outputs the delayed update request signal to the output terminal 189 as a data request signal.

The output data request signal is input to the above-mentioned first table control unit 126.

Rather than using the update request signal, which was sent from the acquisition unit 124, directly as the data request signal, using the delay circuit 180 to delay the update request signal enables avoiding the simultaneous occurrence of reading from and writing to the first table control unit 126.

The identification information creation unit 183 receives an input of the output commencement signal from the input terminal 187, and upon detecting the output commencement signal, creates the notification frame identification information 175 of the notification frame, and outputs the created notification frame identification information 175 to the notification frame creation unit 188.

Also, the output commencement signal is input to the management information creation unit 184 via the delay circuit 182, which delays the output commencement signal until the identification information creation unit 183 completes inputting the notification frame identification information 175 to the notification frame creation unit 185.

Upon detecting the output commencement signal input via the delay circuit 182, the management information creation unit 184 creates the management information 176 (the MAC address of the wireless slave device 3), and outputs the created management information 176 to the notification frame creation unit 185.

The delay circuit 181 receives an input of the table data from the input terminal 188, performs delay processing, and outputs the delayed table data to the notification frame creation unit 185.

The delay processing performed by the delay circuit 181 delays the table data for a delay time set in the delay circuit 182, and an additional time period until the management information creation unit 184 completes inputting the management information 176 to the notification frame creation unit 185.

The notification frame creation unit 185 concatenates, in order of input, the notification frame identification information 175 input from the identification information creation unit 183, the management information 176 input from the management information creation unit 184, and the table data input from the delay circuit 181, creates a notification frame whose frame body is constituted from the resultant concatenated data, and outputs the notification frame to the output terminal 190.

As a result of the above operations, the notification unit 127 creates a notification frame including the MAC addresses stored in the first table storage unit 125, and outputs the created notification frame.

The notification frame output from the notification unit 127 is input to the wireless transmission/reception unit 121, which performs digital modulation on the notification frame to convert the notification frame to transmission signals in a frequency band for wireless transmission, and wirelessly transmits the wireless frame via the antenna 128.

The notification frame acquisition unit 129 receives an input of the wireless frame output from the wireless transmission/reception unit 121, judges whether the input wireless frame is a notification frame, and if the result of the judgment is affirmative, acquires the management information 176 and the terminal table data 177 included in the notification frame.

Moreover, the notification frame acquisition unit 129 outputs update data, a table acquisition source address, and an update request signal based on the acquired information.

Figure 10:
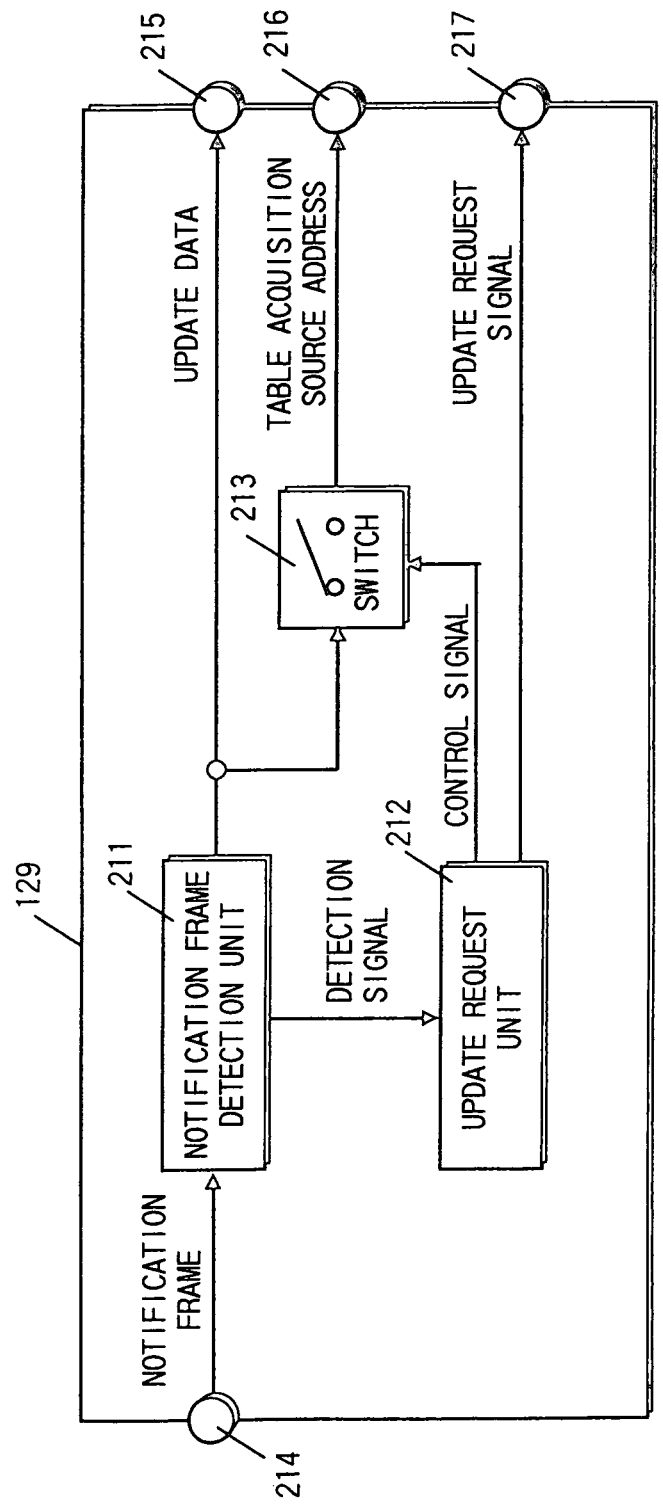
FIG. 10 shows a structure of a notification frame acquisition unit 129.

The following is a detailed description of operations performed in the notification frame acquisition unit 129, with reference to FIG. 10.

FIG. 10 shows a structure of the notification frame acquisition unit 129.

As shown in FIG. 10, the notification frame acquisition unit 129 includes a notification frame detection unit 211, an update request unit 212, a switch 213, an input terminal 214, and output terminals 215 to 217.

The notification frame detection unit 211 receives an input of the wireless frame from the input terminal 214, and determines whether the input wireless frame is a notification frame by checking whether the wireless frame includes the notification frame identification information 175.

If the wireless frame is determined to be a notification frame, the notification frame detection unit 211 outputs a detection signal to the update request unit 212. The notification frame detection unit 211 also reads the management information 171 and the terminal table data 172 included in the notification frame, and outputs the read management information 176 and terminal table data 172 to the output terminal 215 and the switch 213 as update information.

Upon receiving the input of the detection signal from the notification frame detection unit 211, the update request unit 212 outputs an update request signal to the output terminal 217, and outputs a control signal to the switch 213.

In accordance with the control signal, the switch 213 outputs only the table acquisition source address, which is the management information 176 included in the input update data, to the output terminal 216.

As a result of the above operations, the notification frame acquisition unit 129 determines whether the wireless frame is a notification frame, and outputs the update data, the table acquisition source address and the update request signal to the second table control unit 110 if the result of the determination is affirmative.

Upon detecting the update request signal, the second table control unit 110 performs writing to the second table storage unit 112 based on the same input update data and table acquisition source address.

The second table storage unit 122 stores, for example, table data expressing a table such as is shown in FIG. 12.

FIG. 12 shows exemplary table content of the table data stored in the second table storage unit 112.

The table shown in FIG. 12 is constituted from matrix data of a fixed size, and memory areas of a fixed size and memory address are allocated in order from the first cell, then second, third, fourth, and fifth cells of the first row, then the first cell of the second row in the second table storage unit 112.

In the table shown in FIG. 12, acquired terminal tables can be stored in row units, and five MAC addresses can be stored in each row. Table acquisition source MAC addresses from which the terminal tables were acquired, that is, the MAC addresses of other wireless slave terminals, are stored in the memory areas of the first column.

Four MAC addresses can be sequentially stored as terminal tables in order from the second column. For example, the MAC addresses of the terminals 11 to 13 are stored in the terminal table of the wireless slave device 2.

Note that the MAC address of the wireless master device 1 is recorded as an initial value in the first row in the table stored by the second table storage unit 112.

The second table control unit 110 receives an input of the data request signal from the filtering unit 111, and upon detecting the input of the data request signal, sequentially reads the MAC addresses stored in the second table storage unit 112, outputs the read MAC addresses to the filtering unit 111, and at the same time outputs an output enable signal.

Figure 11:
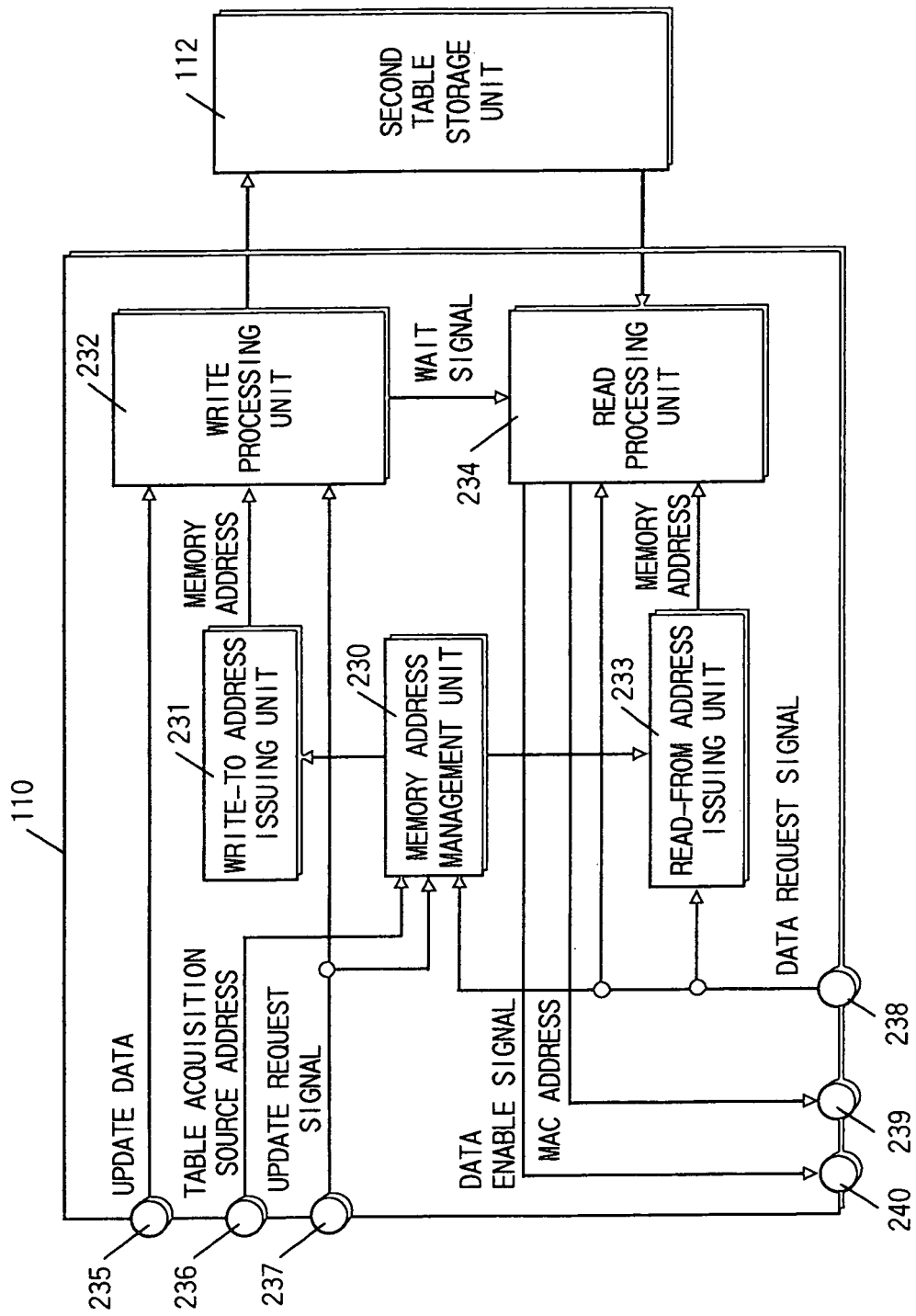
FIG. 11 shows a structure of a second table control unit 110.

The following is a detailed description of operations performed in the second table control unit 110, with reference to FIG. 11.

FIG. 11 shows a structure of the second table control unit 110.

As shown in FIG. 11, the second table control unit 110 includes a memory address management unit 230, a write-to address issuing unit 231, a write processing unit 232, a read-from address issuing unit 233, a read processing unit 234, input terminals 235 to 238, and output terminals 239 and 240.

The second table control unit 110 and the second table storage unit 122 are connected via a bus which is not depicted.

First is a description of write processing of the second table control unit 110.

The memory address management unit 230 manages, in the second table storage unit 112, the memory addresses allocated to the table acquisition source MAC addresses in association with the values of MAC addresses stored in the areas pertaining to the memory addresses.

The memory address management unit 230 receives an input of the table acquisition source addresses from the input terminal 236, and the update request signal from the input terminal 237, and upon detecting the update request signal, outputs, to the write-to address issuing unit 231, the memory addresses storing the values of the same input table acquisition source addresses.

For example, if the second table storage unit 112 is in a storage condition as shown in FIG. 12, the value "STA(3)", which is the MAC address of the wireless slave device 3, is input to the memory address management unit 230 as the table acquisition source address.

At this time, the memory address management unit 230 outputs the memory address of the memory area storing the value "STA(3)" (in FIG. 12, the memory address allocated to the table acquisition source MAC address in the "STA(3)" row).

If there is no record of the input table acquisition source address in the table, the memory address management unit 230 newly allocates a memory address, and outputs this memory address. The memory address management unit 230 also manages the output memory address in association with the input table acquisition source address (MAC address).

For example, if a value of "STA(5)" is input as the table acquisition source address when the second table storage unit 112 is in a storage condition as shown in FIG. 12, the memory address management unit 230 outputs the memory address allocated to the table acquisition source MAC address in the fifth row, which is "NO ENTRY".

Upon receiving an input of the memory address from the memory address management unit 230, the write-to address issuing unit 231 outputs, to the write processing unit 232, the input memory address as well as the memory addresses allocated to table data (1), table data (2), table data (3), and table data (4) of the second table storage unit 112 in order.

The write processing unit 232 receives an input of the update request signal from the input terminal 237, and the memory addresses from the write-to address issuing unit 231, and upon detecting the input of the update request signal, sequentially writes the update data to the same input memory address destination.

The second table control unit 110 performs write processing by the above operations performed by the memory address management unit 230, the write-to address issuing unit 231 and the write processing unit 232.

The following describes read processing of the second table control unit 110.

The memory address management unit 230 receives an input of the data request signal from the input terminal 238, and upon detecting the input of the data request signal, outputs, to the read-from address issuing unit 233, the memory address allocated to the last newly recorded table acquisition source MAC address in the second table storage unit 122.

For example, if the second table storage unit 112 is in a storage condition as shown in FIG. 12, the memory address management unit 230 inputs the memory address storing the value "STA(4)" to the read-from address issuing unit 233.

The read-from address issuing unit 233 receives an input of the data request signal from the input terminal 238, and the memory address from the memory address management unit 230, and upon detecting the input of the data request signal, sequentially outputs, to the read processing unit 234, all of the memory addresses allocated to the table acquisition source MAC address, table data (1), table data (2), table data (3), and table data (4) up to the row including the table acquisition source MAC address at the memory address input from the memory address management unit 230.

The read processing unit 234 receives an input of the data request signal from the input terminal 238, and the memory addresses from the read-from address issuing unit 233.

Upon detecting the data request signal, the read processing unit 234 sequentially reads data (MAC addresses) at the same input memory addresses from the second table storage unit 112.

After completing the reading, the read processing unit 234 outputs the read MAC addresses to the output terminal 239, and at the same time outputs a data enable signal to the output terminal 240.

Note that the data enable signal changes from a value of "0" to "1" when the output of the MAC addresses begins, keeps the value of "1" during output, and changes from "1" to "0" when the output is complete.

The second table control unit 110 performs read processing by the above operations performed by the memory address management unit 230, the read-from address issuing unit 233 and the read processing unit 234.

Note that the write processing unit 232 outputs the wait signal to the read processing unit 234 while executing write processing. Here, the read processing unit 234 suspends the reading of data from the second table storage unit 112 while the wait signal with the value of "1" is being input. This prevents write processing and read processing from being performed simultaneously on the second table storage unit 112.

The MAC addresses and data enable signal output by the second table control unit 110 are input to the filtering unit 111.

The filtering unit 111 receives an input of a frame from the wire transmission/reception unit 120, stores the frame in a buffer, and determines whether the destination MAC address of the frame is stored in the second table storage unit 112. The filtering unit 111 outputs the frame stored in the buffer if the result of the determination is affirmative, and discards the frame stored in the buffer if the result of the determination is negative.

Figure 13:
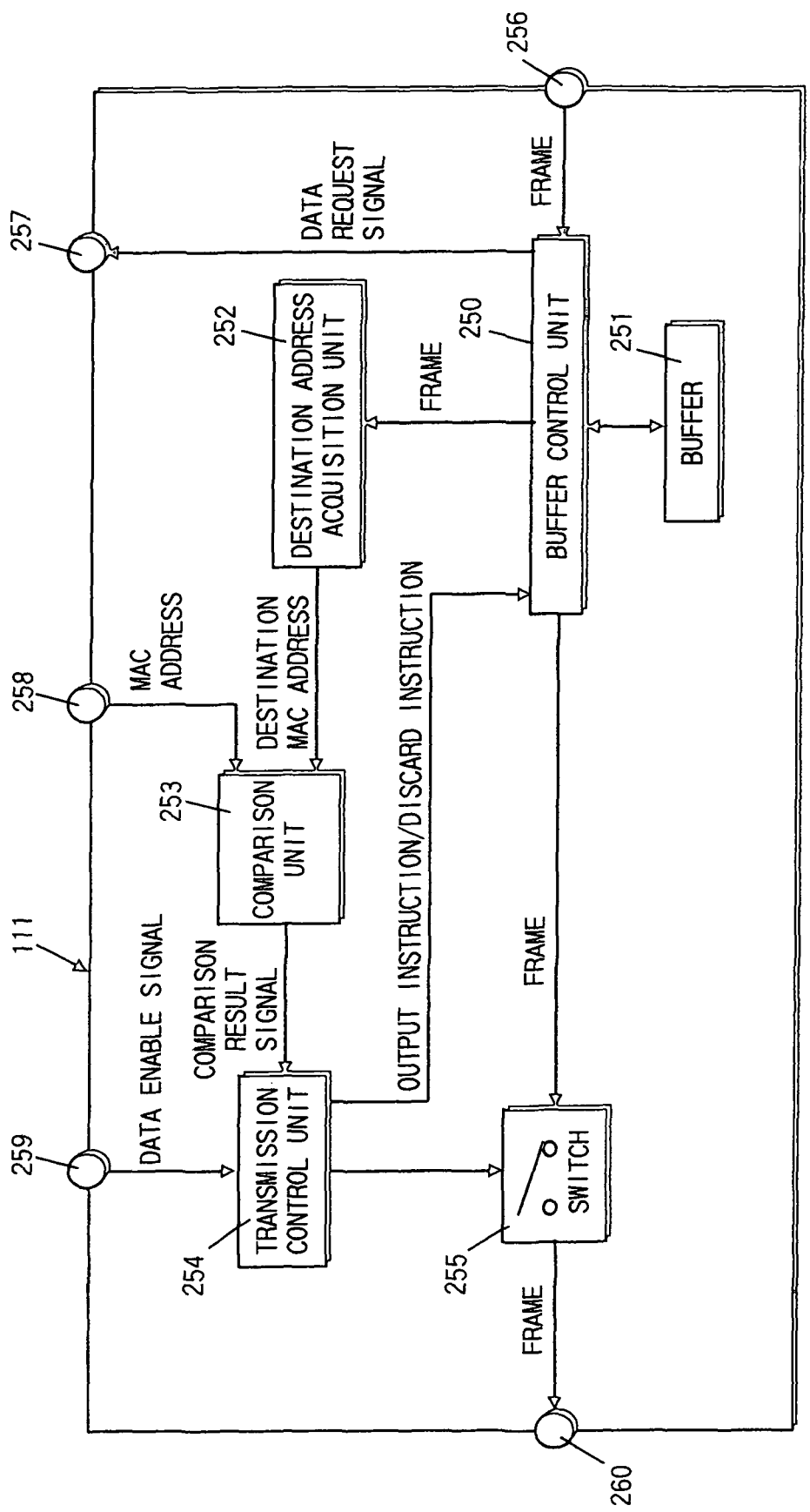
FIG. 13 shows a structure of a filtering unit 111.

The following is a detailed description of operations performed in the filtering unit 111, with reference to FIG. 13.

FIG. 13 shows a structure of the filtering unit 111.

As shown in FIG. 133, the filtering unit 111 includes a buffer control unit 250, a buffer 251, a destination address acquisition unit 252', a comparison unit 253, a transmission control unit 254, a switch 255, input terminals 256, 258 and 259, and output terminals 257 and 260.

Upon detecting the frame input via the input terminal 256, the buffer control unit 250 stores the input frame in the buffer 251 as well as outputs the frame to the destination address acquisition unit 252, and outputs a data request signal to the output terminal 257.

The data request signal is output by the buffer control unit 250 to the second table control unit 110, which reads the MAC addresses stored in the second table storage unit 112. The read MAC addresses are input form the second table control unit 110 to the comparison unit 253 via the input terminal 258. Also, the data enable signal is input to the transmission control unit 254 via the input terminal 259.

The destination address acquisition unit 252 acquires a destination MAC address from the frame input by the buffer control unit 250, and outputs the acquired destination MAC address to the comparison unit 253.

The comparison unit 253 sequentially compares the destination MAC address input by the destination address acquisition unit 252 to MAC addresses input via the input terminal 258.

The comparison unit 253 outputs, to the transmission control unit 254, a result of the comparison as a comparison result signal having a value of "0" or "1". For example, a "1" signal is output if there is a match, and a "0" signal is output if there is not a match.

The transmission control unit 254 receives an input of the data enable signal from the input terminal 259.

The transmission control unit 254 uses a change in the input data enable signal from "0" to "1" as a trigger for commencing monitoring of the comparison result signal input by the comparison unit 253, and continues the monitoring until the data enable signal changes from "1" to "0".

If the result of the monitoring is that the comparison result signal is "1" (there is a match in the comparison result), the transmission control unit 254 sets the switch 255 to "ON" as well as instructs the buffer control unit 250 to output the frame in the buffer 251.

On the other hand, if the result of the monitoring is that the comparison result signal is not "1", the transmission control unit 254 instructs the buffer control unit 250 to discard the frame stored by the buffer 251.

The buffer control unit 250 performs processing in accordance with the output instruction or the discard instruction from the transmission control unit 254. In other words, the buffer control unit 250 reads and outputs the frame stored in the buffer 251 upon receiving the output instruction from the transmission control unit 254. The frame output by the buffer control unit 250 is input to the switch, and output to the output terminal 260 via the switch 255 in the "ON" state.

Also, upon receiving the discard instruction from the transmission control unit 254, the buffer control unit 250 discards the frame stored in the buffer 251 without performing output.

As a result of the above operations, the filtering unit 111 performs filtering on the frame input by the wire transmission/reception unit 120.

The frame output by the filtering unit 111 is input to the wireless frame conversion unit 122.

The wireless frame conversion unit 122 converts the input frame to an IEEE 802.11-compliant wireless frame, and outputs the wireless frame to the wireless transmission/reception unit 121.

The wireless transmission/reception unit 121 performs digital modulation on the wireless frame input by the wireless frame conversion unit 122 to convert the wireless frame to transmission signals in a frequency band for wireless transmission, and transmits the wireless frame via the antenna 128.

Embodiment 2

Next is a description of embodiment 2 of the present invention.

Figure 14:
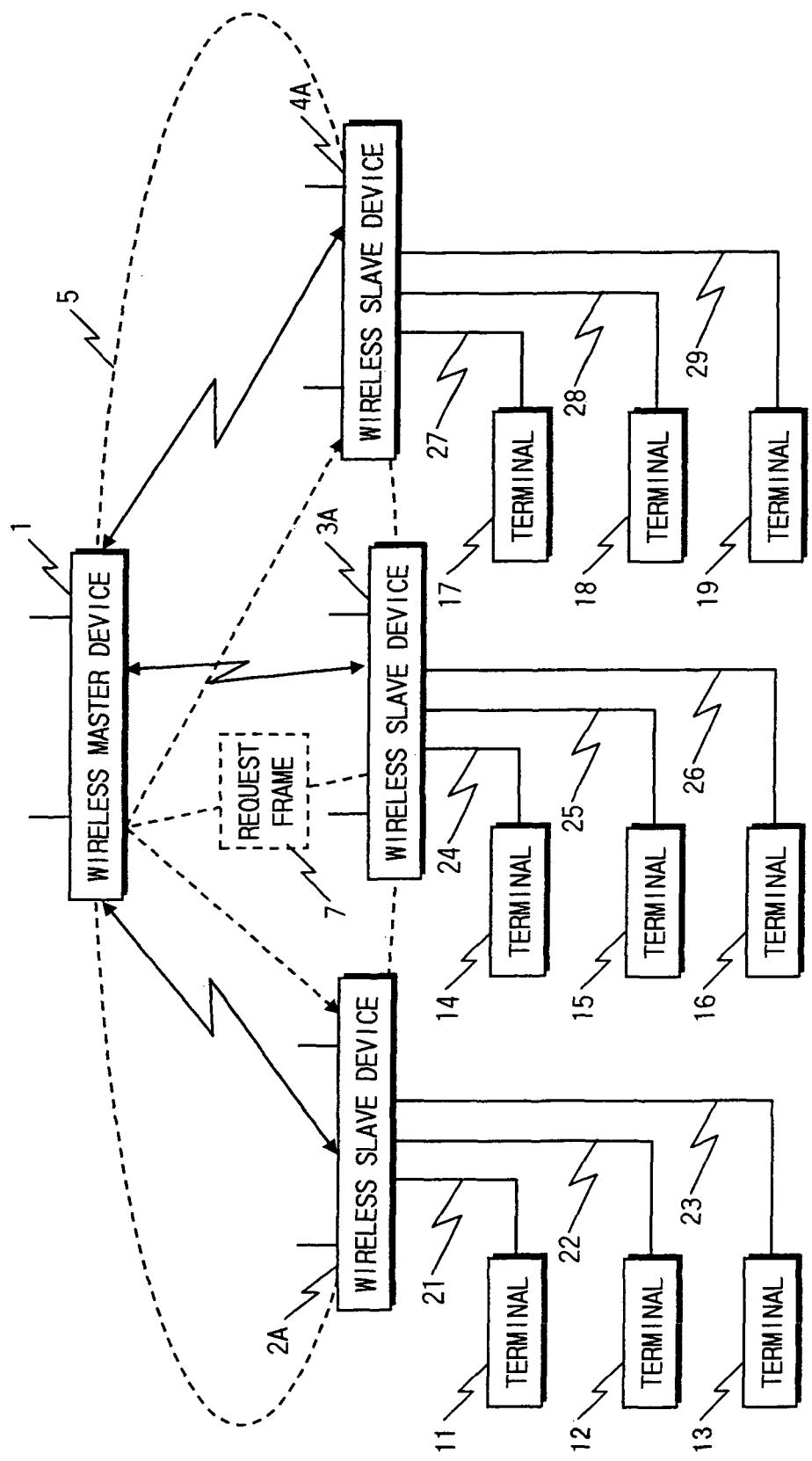
FIG. 14 shows an exemplary communication network including wired networks and a wireless network.

FIG. 14 shows an exemplary communication network constituted from a wireless master device, wireless slave devices, and terminals connected to the wireless slave devices by LAN cables.

Embodiment 2 differs from embodiment 1 in that the a wireless slave device wirelessly transmits, to the other wireless slave devices, a request frame that requests the MAC addresses of terminals connected by wire to the other wireless slave devices.

A wireless slave device that wirelessly received the request frame wirelessly transmits, to the wireless slave device that wirelessly transmitted the request frame, the notification frame described in embodiment 1.

The content of FIG. 14 other than the wireless slave devices 2A to 4A is the same as the units described in embodiment 1, and the following therefore describes only differing points.

Figure 15:
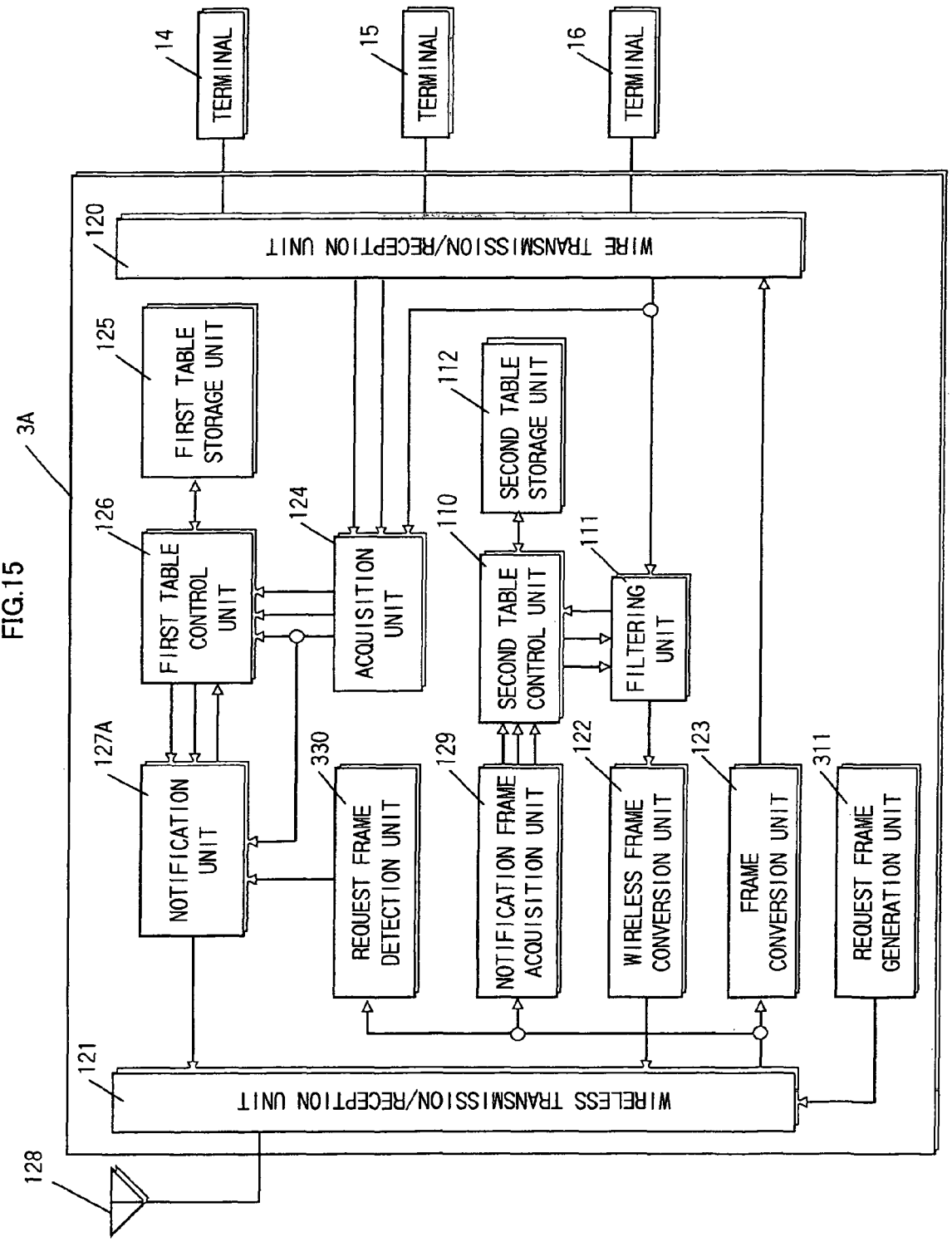
FIG. 15 shows a structure of a wireless slave device 3A according to embodiment 2.

FIG. 15 shows a structure of the wireless slave device 3A.

Descriptions of the wireless slave devices 2A and 4A have been omitted since they have the same structure as the wireless slave device 3A.

Also, the same numbers have been given to constituent elements that are the same as in embodiment 1, and detailed descriptions thereof have been omitted.

The wireless slave device 3A includes the wire transmission/reception unit 120, the wireless transmission/reception unit 121, the wireless frame conversion unit 122, the frame conversion unit 123, the acquisition unit 124, the first table storage unit 125, the first table control unit 126, a notification unit 127A, the antenna 128, the notification frame acquisition unit 129, the second table control unit 110, the filtering unit 111, the second table storage unit 112, a request frame generation unit 311, and a request frame detection unit 330.

The request frame generation unit 311 includes a timer, and creates a request frame 300 in accordance with a cyclical timing.

Figure 16:
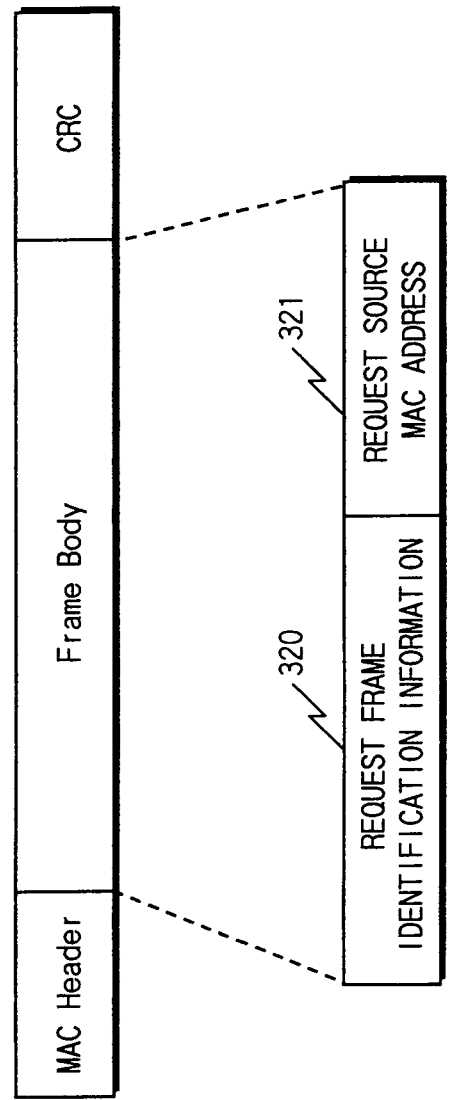
FIG. 16 shows a structure of a request frame created by a request frame generating unit 311.

FIG. 16 shows a structure of the request frame created by the request frame generation unit 311.

The request frame shown in FIG. 16 has a frame format conforming to the IEEE 802.11 standard, and a destination MAC address is set to a broadcast address.

Also, a frame body storing data is constituted from request frame identification information 320 and a request source MAC address 321.

The request frame identification information 320 is data of a fixed length, and includes data that enables identification of the frame as a request frame.

The request source MAC address 321 is data of a fixed length, and includes the MAC address of the wireless slave device that created the request frame.

The request frame created by the request frame generation unit 311 is input to the wireless transmission/reception unit 121, which performs digital modulation on the input request frame to convert the request frame to transmission signals in a frequency band for wireless transmission, and transmits the wireless frame via the antenna 128.

The wireless frame detection unit 330 receives an input of the wireless frame from the wireless transmission/reception unit 121, and checks whether the input wireless frame includes the request frame identification information 320 to determine whether the wireless frame is a request frame.

If the result of the determination is affirmative, the request frame detection unit 330 acquires the request source MAC address 321 from the request frame, and outputs the acquired request source MAC address 321 as a notification destination MAC address. The request frame detection unit 330 also outputs a data request signal to the notification unit 127A.

The notification unit 127A outputs the data request signal as is to the first table control unit 126.

Upon detecting an input of the data request signal, the first table control unit 126 sequentially reads the MAC addresses stored in the table storage unit 125, and outputs the read MAC addresses to the notification unit 127A as table data.

A description of the processing thereafter has been omitted since it is the same as in embodiment 1.

As a result of the above operations, the notification unit 127A creates a request frame including the MAC addresses stored in the first table storage unit 125, and outputs the created notification frame to the wireless transmission/reception unit 121.

The wireless transmission/reception unit 121 performs digital modulation on the notification frame input by the notification unit 127A to convert the notification frame to transmission signals in a frequency band for wireless transmission, and wirelessly transmits the wireless frame via the antenna 128.

Embodiment 3

Next is a description of embodiment 3 of the present invention.

Embodiment 3 differs from embodiment 1 in that the wireless slave devices include a MAC address of a terminal that was once connected by wire but then disconnected (hereinafter, called a "disconnected terminal MAC address") in the notification frame wirelessly transmitted to the other wireless slave devices, and that the wireless slave devices that receive the notification frame store, in the second table storage unit 112, the MAC address of the wireless slave device that transmitted the notification frame in association with the disconnected terminal MAC address included in the notification frame, and upon wirelessly receiving a frame from a terminal connected by wire, performs filtering to discard the frame if the destination MAC address of the frame matches the disconnected terminal MAC address stored in the second table storage unit 112.

Figure 17:
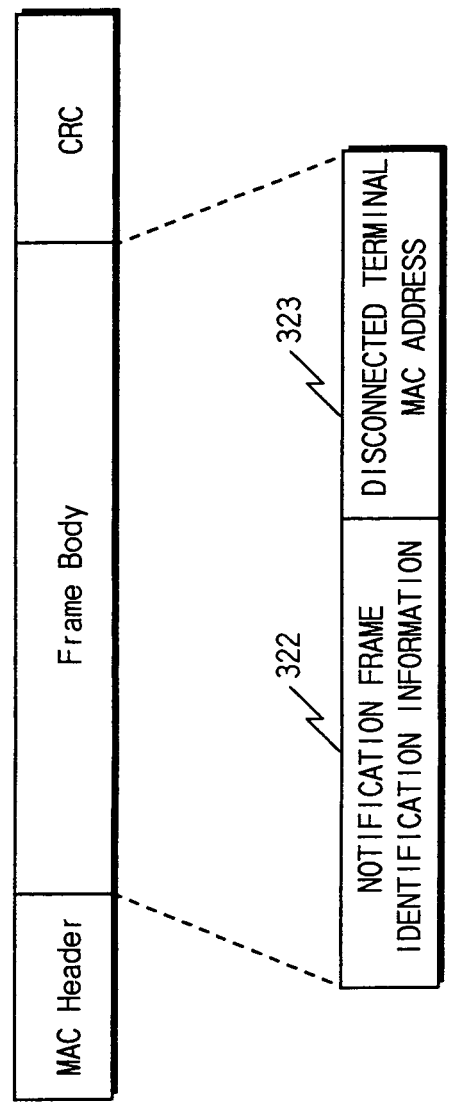
FIG. 17 shows a structure of a notification frame in embodiment 3.

FIG. 17 shows a structure of the notification frame in embodiment 3.

The notification frame show in FIG. 17 has a frame formation conforming to the IEEE 802.11 standard, and the destination MAC address is set to a broadcast address.

Also, a frame body storing data is constituted from notification frame identification information 322 and a disconnected terminal MAC address 323.

The notification frame identification information 322 is data of a fixed length, and includes data that enables identification of the frame as a notification frame.

The disconnected terminal MAC address 323 is data of a fixed length and includes the MAC address of a terminal disconnected from the wireless slave device.

Figure 18:
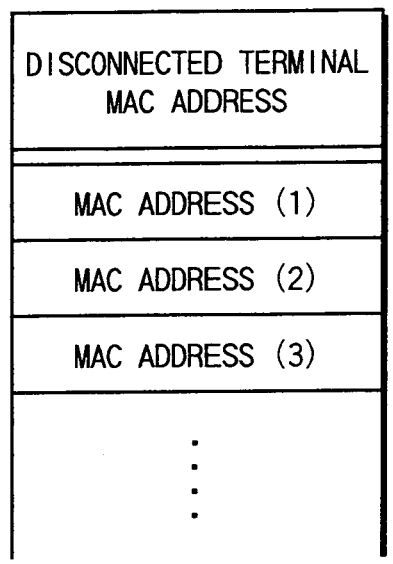
FIG. 18 shows an exemplary table of MAC addresses of disconnected terminals stored by the second table storage units 112 of wireless slave devices.

FIG. 18 shows an exemplary table of disconnected terminal MAC addresses stored in the second tale storage unit 112 based on the notification frame wirelessly received by the wireless slave devices.

For example, if a wireless slave device storing the table shown in FIG. 18 receives by wire a frame addressed to MAC address (1) from a terminal connected by wire, the filtering unit included in the wireless slave device discards the frame since MAC address (1) is stored in the second table storage unit as a disconnected terminal MAC address.

Embodiment 4

Next is a description of embodiment 4 of the present invention.

Embodiment 4 differs from embodiment 1 in that the content of the notification frame notified to the other wireless slave devices is notified by being attached to an ARP (Address Resolution Protocol) packet, and that a wireless LAN in embodiment 4 conforms to the IEEE 802.11e standard, and wireless communication can be performed directly between wireless slave devices without involving a wireless master device.

Although not depicted, wireless slave devices 2B to 4B are the same as the wireless slave devices 2 to 4 shown in FIG. 1, and the following describes the wireless slave devices 2B to 4B pertaining to embodiment 4.

Figure 19:
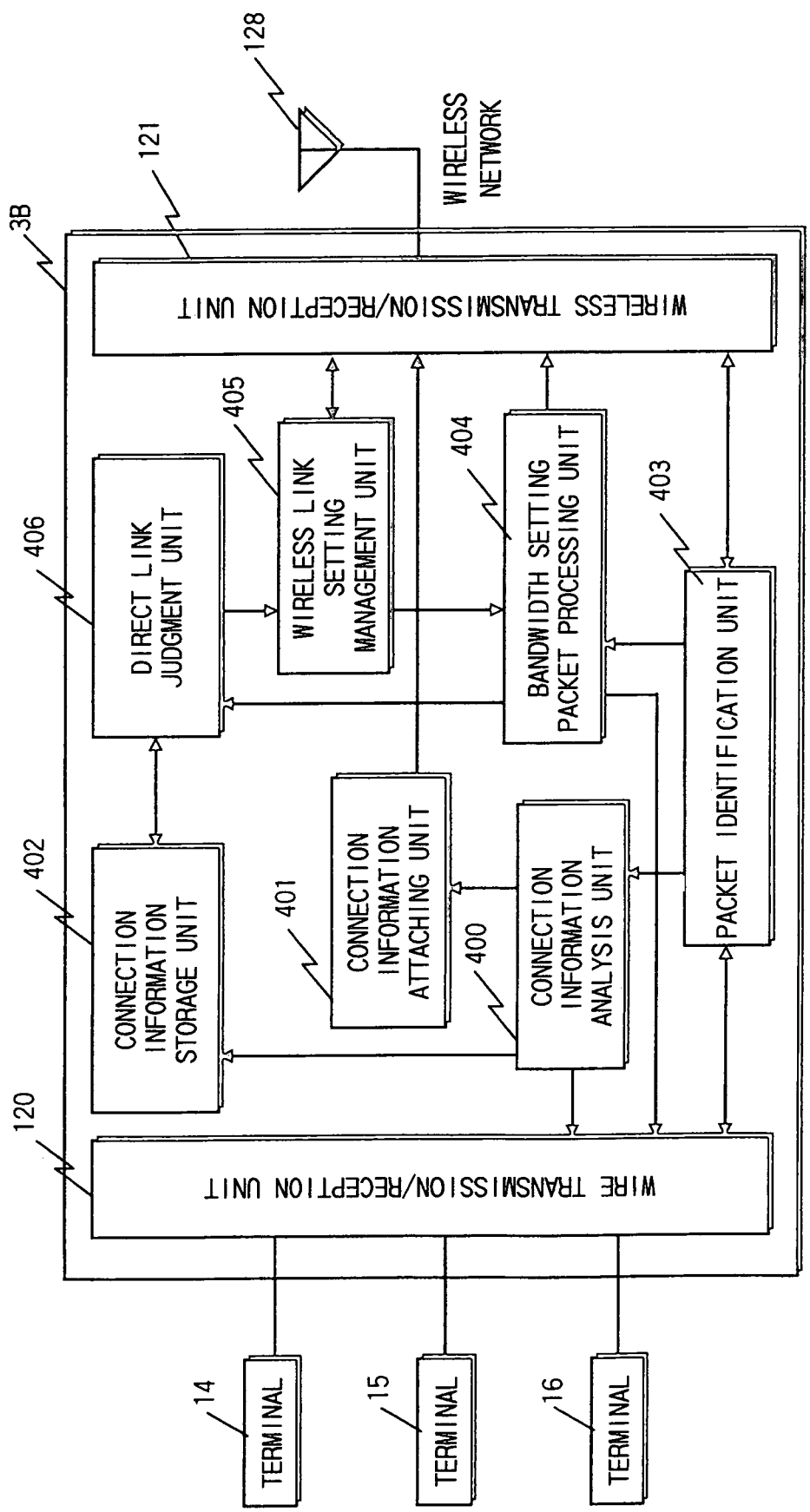
FIG. 19 shows a structure of a wireless slave device 3B according to embodiment 4.

FIG. 19 shows a structure of the wireless slave device 3B.

Descriptions of the wireless slave devices 2B and 4B have been omitted since they have the same structure as the wireless slave device 3B.

Also, the same numbers have been given to constituent elements that are the same as in embodiment 1, and detailed descriptions thereof have been omitted.

The wireless slave device 3B includes the wire transmission/reception unit 120, the wireless transmission/reception unit 121, a connection information analysis unit 400, a connection information attaching unit 401, a connection information storage unit 402, a packet identification unit 403, a bandwidth setting packet processing unit 404, a wireless link setting management unit 405, and a direct link judgment unit 406.

The wire transmission/reception unit 120 and the wireless transmission/reception unit 121 are the same as in embodiment 1.

The packet identification unit 403 identifies bandwidth setting packets and ARP (Address Resolution Protocol) packets from data input via the wireless transmission/reception unit 121 or the wire transmission/reception unit 120.

The connection information analysis unit 400 analyzes information necessary for settings pertaining to direct communication between wireless slave devices, which is included in an ARP packet transferred from the packet identification unit 403.

The connection information attaching unit 401 attaches the information necessary for direct communication between wireless slave devices to the ARP packet transferred from the connection information analysis unit 400.

FIG. 20 shows a data structure of an ARP packet, which is a communication protocol specified by the IETF (Internet Engineering Task Force), and FIG. 21 shows a data structure of connection information to be attached to the ARP packet.

The connection information is constituted from the MAC address of the wireless master device, its own (the wireless slave device's) MAC address, and the MAC address of the terminal that issued the ARP packet.

The MAC address of the wireless master device is used to identify to which BSS the wireless master device belongs, and the MAC address of the wireless slave device and the MAC address of the of the terminal that issued the ARP packet are used to identify which wireless slave device and terminal are connected via a wired network.

The connection information storage unit 402 stores a table that manages connection statuses of terminals based on an instruction from the connection information analysis unit 400.

The bandwidth setting packet processing unit 404 analyzes a packet that was transferred from the packet identification unit 403 and requests securing or freeing of wireless bandwidth.

Upon receiving information included in a bandwidth setting request transferred from the bandwidth setting packet processing unit 404, the direct link judgment unit 406 judges the connection status of a terminal based on the table stored in the connection information storage unit 402.

The wireless link setting management unit 405 sets wireless link bandwidth based on the judgment result of the direct link judgment unit 406.

The following describes operations when direct communication is performed between the terminal 11 connected by wire to the wireless slave device 2B and the terminal 14 connected by wire to the wireless slave device 3B.

Figure 22:
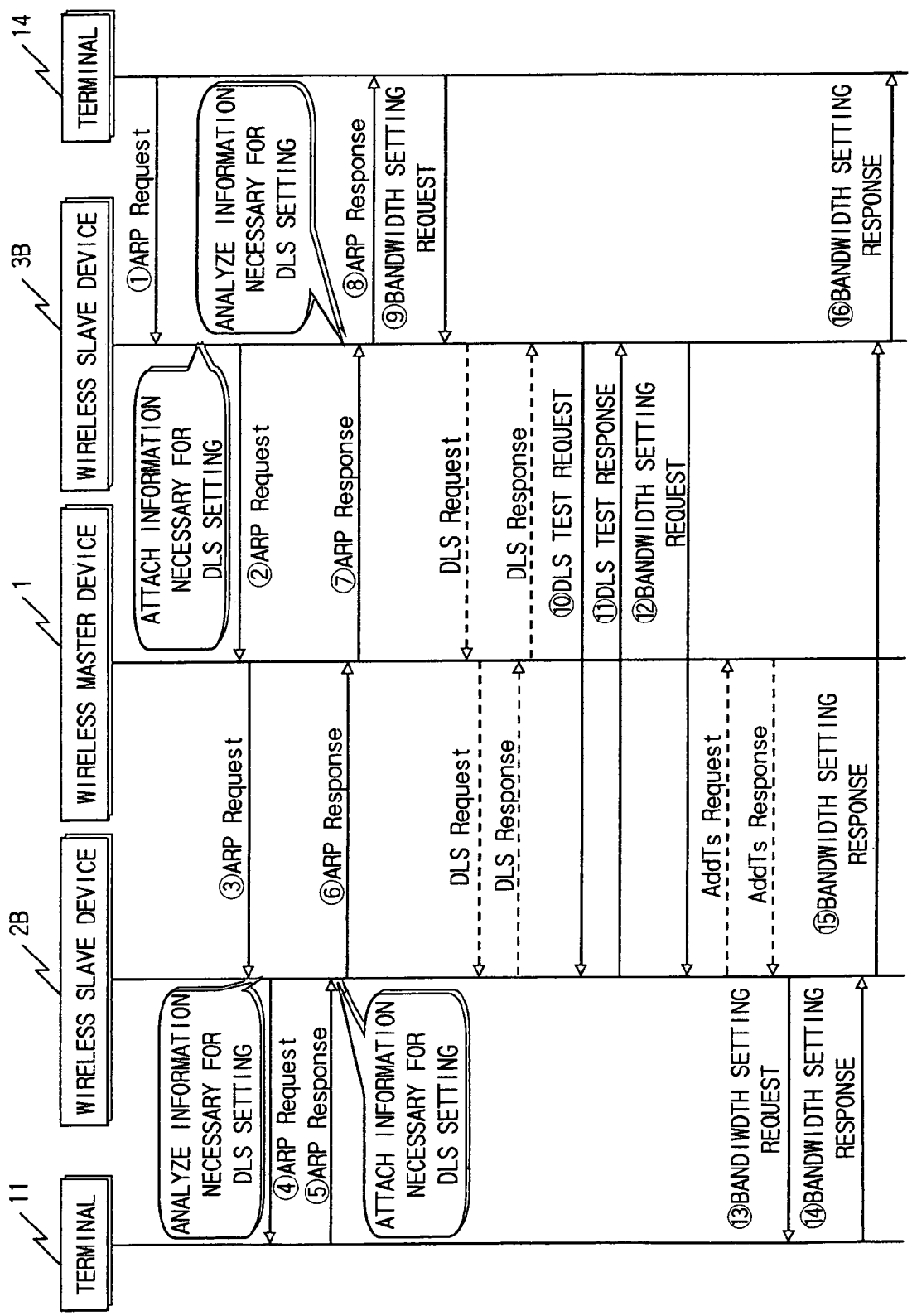
FIG. 22 is an exemplary sequence diagram showing a communication flow when direct communication is performed between wireless slave devices.

FIG. 22 is a sequence diagram showing a communication flow when direct communication is performed between wireless slave devices.

In FIG. 22, sequences of communication flow based on the IEEE 802.11e standard are indicated by broken lines, and all other sequences are indicated by solid lines.

In the present embodiment, a bandwidth reservation-type communication protocol is used as a trigger for commencing the communication flow of direct communication between wireless slave devices.

Examples of a bandwidth reservation-type communication protocol include ST2 (Internet Stream Protocol Version 2) specified by the IETF, and RSVP (Resource reSerVation Protocol).

In FIG. 22, bandwidth setting requests and bandwidth setting responses are communication flows of bandwidth reservation-type communication protocols.

First, prior to the transfer of data from the terminal 14 to the terminal 11, the terminal 14 broadcast transmits an ARP request packet (1) including a known IP address allocated to the terminal 11, to attempt to acquire the MAC address of the terminal 11 before transmitting, to the wireless slave device 3B, a bandwidth setting request (9) (In FIG. 22, 9 is enclosed in a circle. Hereinafter, numbers enclosed in parentheses correspond to numbers enclosed in circles in the drawings.) for securing necessary bandwidth.

For example, in the case of the terminals 11 and 14 transferring data using UPnP (Universal Plug and Play) AV, ARP packets are broadcast when the terminals 11 and 14 determine their addresses when connecting to the network, and when a content list is exchanged between the terminals 11 and 14.

Upon receiving the ARP request packet (1) transmitted from the terminal 14, the wire transmission/reception unit 120 of the wireless slave device 3B transfers the received packet to the packet identification 403.

Upon receiving an input of the ARP request packet, the packet identification unit 403 transfers the packet to the connection information analysis unit 400.

Upon receiving an input of the ART request packet, the connection information analysis unit 400 analyzes the content of the packet, and examines whether connection information is attached.

Here, the connection information analysis unit 400 transfers the ARP request packet as is to the connection information attaching unit 401 since connection information is not attached.

Upon receiving an input of the ARP request packet, the connection information attaching unit 401 attaches connection information.

After the connection information has been attached to the ARP request packet by the connection information attaching unit 401, the wireless slave device 3B wirelessly transmits the ARP request packet (2) to the wireless master device 1 via the wireless transmission/reception unit 121.

Upon wirelessly receiving the ARP request packet (2) the wireless master device 1 wirelessly transfers (3) the received ARP request packet (2).

Upon wirelessly receiving the ARP request packet (3) transferred from the wireless master device 1, the wireless transmission/reception unit 121 of the wireless slave device 2B transfers the ARP request packet (3) to the packet identification unit 403.

Upon receiving an input of the ARP request packet, the packet identification unit 403 transfers the ARP request packet to the connection information analysis unit 400.

Upon receiving an input of the ARP request packet, the connection information analysis unit 400 analyzes the content of the ARP request packet, and examines whether connection information is attached.

If it is found as a result of the analysis that connection information is attached to the ARP request packet, the connection information analysis unit 400 discerns from the MAC address of the wireless master device 1 included in the connection information whether the connection information was attached by a wireless slave device in the same BSS (Basic Service Set).

If it is discerned that the connection information was attached by a wireless slave device in the same BSS, the connection information analysis unit 400 transfers, to the connection information storage unit 402, the MAC address of the wireless slave device included in the connection information (here, the MAC address of the wireless slave device 3B) and the MAC address of the terminal that issued the ARP packet (here, the MAC address of the terminal 14).

The connection information storage unit 402 stores a table that includes the MAC addresses of the other wireless slave devices in association with the MAC addresses of terminals connected by wire to the other wireless slave devices, and updates the table when a new MAC address is transferred from the connection information analysis unit 400.

The connection information analysis unit 400 removes the received connection information from the ARP request packet to which it was attached, outputs the ARP request packet to the wire transmission/reception unit 120, which transmits by wire the ARP request packet (4) which does not have the connection information attached.

Upon receiving the ARP request packet from the wireless slave device 2B, the terminal 11 writes its own MAC address to the packet, and returns the packet as ARP response packet (5).

Upon receiving the ARP response packet (5) transmitted by wire from the terminal 11, the wire transmission/reception unit 120 of the wireless slave device 2B transfers the received packet to the packet identification unit 403.

Upon receiving an input of the ARP response packet, the packet identification unit 403 transfers the received packet to the connection information analysis unit 400.

Upon receiving an input of the ARP response packet, the connection information analysis unit 400 analyzes the content of the packet and examines whether connection information is attached.

Here, the connection information analysis unit 400 transfers the ARP response packet as is to the connection information attaching unit 401 since connection information is not attached.

Upon receiving an input of the ARP response packet, the connection information attaching unit 401 attaches connection information.

After the connection information has been attached to the ARP response packet by the connection information attaching unit 401, the wireless slave device 2B wirelessly transmits the ARP response packet (6) to the wireless master device 1 via the wireless transmission/reception unit 121.

Upon wirelessly receiving the ARP response packet (6), the wireless master device 1 wirelessly transfers the ARP response packet (7) to the wireless slave device 3B.

Upon wirelessly receiving the ARP response packet (7) transferred from the wireless master device 1, the wireless transmission/reception unit 121 of the wireless slave device 3B transfers the received packet to the packet identification unit 403.

Upon receiving an input of the ARP response packet, the packet identification unit 403 transfers the received packet to the connection information analysis unit 400.

Upon receiving an input of the ARP response packet, the connection information analysis unit 400 analyzes the content of the received packet and examines whether connection information is attached.

If it is found as a result of the analysis that connection information is attached to the ARP response packet, the connection information analysis unit 400 discerns from the MAC address of the wireless master device 1 included in the connection information whether the connection information was attached by a wireless slave device in the same BSS (Basic Service Set).

If it is discerned that the connection information was attached by a wireless slave device in the same BSS, the connection information analysis unit 400 transfers, to the connection information storage unit 402, the MAC address of the wireless slave device included in the connection information (here, the MAC address of the wireless slave device 2B) and the MAC address of the terminal that issued the ARP packet (here, the MAC address of the terminal 11).

The connection information storage unit 402 updates the table when a new MAC address is transferred from the connection information analysis unit 400.

The connection information analysis unit 400 removes the received connection information from the ARP response packet to which it was attached, outputs the ARP response packet to the wire transmission/reception unit 120, which transmits by wire the ARP response packet (8) which does not have the connection information attached.

The terminal 14 that received the ARP response packet acquires the MAC address of the terminal 11 included therein.

Then, in order to secure a stable communication quality (QoS: Quality of Service), the terminal 14 transmits the bandwidth setting request (9) indicating a necessary amount of bandwidth to be secured, addressed to the previously acquired MAC address of the terminal 11.

The bandwidth setting request includes a value of requested bandwidth necessary for data transfer, and additionally identifiers for identifying data (e.g., the MAC addresses and IP address of the terminal, and TCP and UDP port numbers).

Upon receiving the bandwidth setting request transmitted from the terminal 14 via the wire transmission/reception unit 120, the wireless slave device 3B transfers the bandwidth setting request to the packet identification unit 403.

Upon receiving an input of the bandwidth setting request, the packet identification unit 403 transfers the bandwidth setting request to the bandwidth setting packet processing unit 404.

Upon receiving an input of the bandwidth setting request, the bandwidth setting packet processing unit 404 analyzes the content of the bandwidth setting request, and transfers the content to the direct link judgment unit 406.

Upon receiving an input of the content of the bandwidth setting request, the direct link judgment unit 406 references the connection information storage unit 402 to determine whether the terminal 11 is connected to the wireless slave device 2B.

Next, due to being on the data receiving side, the direct link judgment unit 406 judges not to perform HCCA setting. This is because the IEEE 802.11e standard specifies that an AddTs request is transmitted from a wireless slave device on the data transmitting side.

Next, the wireless link setting management unit 405 creates a DLS request for DLS setting, and the DLS request is wirelessly transmitted from the wireless transmission/reception unit 121 to the wireless slave device 2B via the wireless master 1.

Upon wirelessly receiving the DLS request via the wireless master device 1, the wireless slave device 2B, due to supporting DLS, returns, to the wireless slave device 3B via the wireless master device 1, a DLS response that includes information indicating an affirmative judgment pertaining to DLS capability.

When the wireless slave device 3B receives the DLS response via the wireless master device 1, the wireless link setting management unit 405 examines the judgment result pertaining to DLS setting.

If the judgment result is "DLS capable", the wireless link setting management unit 405 transmits, by direction communication, DLS test request (10) to the wireless slave device 2B to examine whether direction communication between wireless slave devices is possible.

Upon wirelessly receiving the DLS test request, the wireless slave device 2B returns DLS test response (11).

Note that the wireless slave device 3B performs HCCA (Hybrid Coordination Function Controlled Channel Access) setting by down link if the result included in the DLS response is "not DLS capable", or if the DLS test response is not returned within a predetermined time period.

Upon wirelessly receiving the DLS test response, the wireless slave device 3B transfers, by direct communication, bandwidth setting request (12) to the wireless slave device 2B.

Upon wirelessly receiving the bandwidth setting request, the wireless slave device 2B wirelessly transmits an AddTs request, which is a wireless management frame, to the wireless master device 1.

Upon wirelessly receiving the AddTs request, the wireless master device 1 judges bandwidth allocated in a wireless network 21, and returns an AddTs response including the result of the judgment to the wireless slave device 2B.

Here, the result of the bandwidth allocation judgment by the wireless master device 1 is "success".

Upon receiving the AddTs response, the wireless slave device 2B transfers, to the terminal 11, bandwidth setting request (13) to which the judgment result has been attached.

Upon receiving the bandwidth setting request by wire, the terminal 11 returns bandwidth setting response (14) that includes information regarding the bandwidth setting request and is addressed to the terminal 14.

The bandwidth setting response is transferred (15 and 16) by the wireless slave devices 2B and 3B, and received by the terminal 14.

Figure 23:
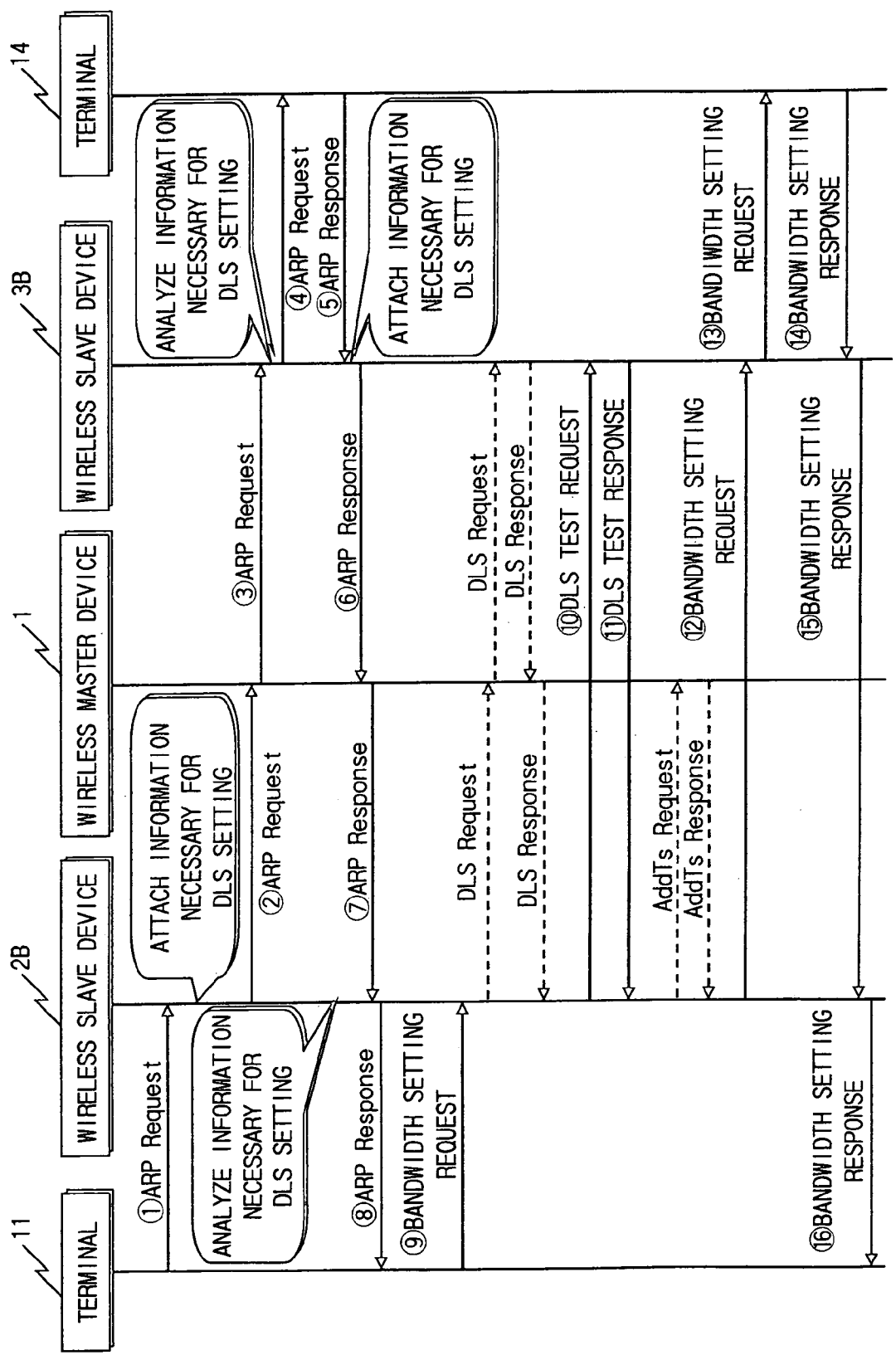
FIG. 23 is an exemplary sequence diagram showing a communication flow when direct communication is performed between wireless slave devices.
Figure 24:
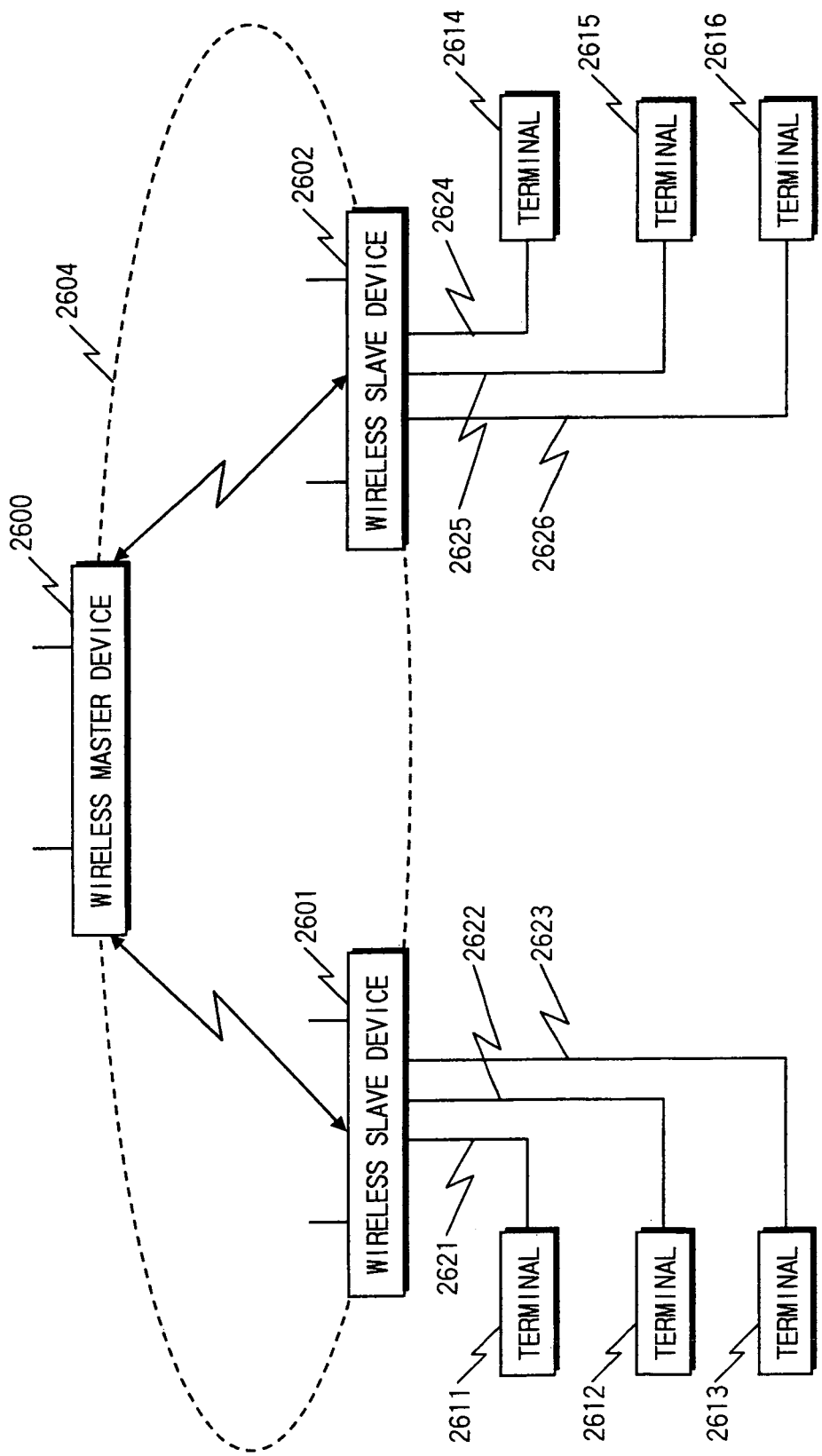
FIG. 24 shows an exemplary communication network including wired networks and a wireless network.

Whereas the above-described communication flow is for realizing direct communication between wireless slave devices when the terminal 14 on the data receiving side does not know the MAC address of the terminal 11 on the data transmitting side, the following briefly describes a communication flow for realizing direction communication between wireless slave devices when, conversely, the terminal 11 on the data transmitting side does not know the MAC address of the terminal 14 on the data receiving side, with reference to FIG. 23.

First, the terminal 11 transmits the ARP-request (1) to attempt to acquire the MAC address of the terminal 14.

The wireless slave device 2B that received the ARP request packet attaches connection information including the MAC address of the wireless master device 1, its own MAC address and the MAC address of the terminal 11, and wirelessly transmits, to the wireless master device 1, the ARP request packet (2) to which the connection information has been attached.

Upon wirelessly receiving the ARP request packet (2), the wireless master device 1 transfers the received packet to the wireless slave device 3B.

Upon wirelessly receiving the ARP request packet (3) from the wireless master device 1, the wireless slave device 3B stores, in the connection information storage unit 402, the MAC address of the terminal 11 included in the attached connection information in association with the MAC address of the wireless slave device 2B. The wireless slave device 3B then transmits by wire the ARP request packet (4), from which the connection information has been removed, to the terminal 14.

Upon receiving the ARP request packet (4), the terminal 14 writes its own MAC address to the ARP request packet (4), and returns the ARP response packet (5) addressed to the terminal 11.

The wireless slave device 3B that received the ARP response packet (5) attaches connection information including the MAC address of the wireless master device 1, its own MAC address and the MAC address of the terminal 14, and wirelessly transmits, to the wireless master device 1, the ARP response packet (6) to which the connection information has been attached.

Upon wirelessly receiving the ARP response packet (6), the wireless master device 1 transfers the received packet to the wireless slave device 2B.

Upon wirelessly receiving the ARP response packet (7) from the wireless master device 1, the wireless slave device 2B stores, in the connection information storage unit 402, the MAC address of the terminal 14 included in the attached connection information in association with the MAC address of the wireless slave device 2B. The wireless slave device 2B then transmits by wire the ARP response packet (8), from which the connection information has been removed, to the terminal 11.

The terminal 11 that received the ARP response packet acquires the MAC address of the terminal 14 included therein.

In order to secure a stable communication quality (QoS: Quality of Service), the terminal 11 transmits the bandwidth setting request (9) indicating a necessary amount of bandwidth to be secured, addressed to the previously acquired MAC address of the terminal 14.

Upon receiving the bandwidth setting request transmitted from the terminal 11, the wireless slave device 2B creates a DLS request for DLS setting, and wirelessly transmits the DLS request to the wireless slave device 3B via the wireless master device 1.

Upon wirelessly receiving the DLS request via the wireless master device 1, the wireless slave device 3B, due to supporting DLS, returns, to the wireless slave device 2B via the wireless master device 1, a DLS response including information that indicates an affirmative judgment pertaining to DLS capability.

Upon receiving the DLS response via the wireless master device 1, the wireless slave device 2B examines the judgment result pertaining to DLS setting.

If the judgment result is "DLS capable", the wireless slave device 2B transmits, by direction communication, the DLS test request (10) to the wireless slave device 3B to examine whether direction communication between wireless slave devices is possible.

Upon wirelessly receiving the DLS test request, the wireless slave device 3B returns the DLS test response (11).

Upon wirelessly receiving the DLS test response, the wireless slave device 2B wirelessly transmits an AddTs request, which is a wireless management frame, to the wireless master device 1.

Upon wirelessly receiving the AddTs request, the wireless master device 1 judges bandwidth allocated in the wireless network 21, and returns an AddTs response including the result of the judgment to the wireless slave device 2B.

Here, the result of the bandwidth allocation judgment by the wireless master device 1 is "success".

Upon receiving the AddTs response, the wireless slave device 2B wirelessly transmits, to the wireless slave device 3B by direct communication, the bandwidth setting request (12) to which the judgment result has been attached.

Upon wirelessly receiving the bandwidth setting request, the wireless slave device 3B transfers the bandwidth setting request to the terminal 14.

Upon receiving the bandwidth setting request (13) by wire, the terminal 14 returns the bandwidth setting response (14) including information pertaining to the bandwidth setting request, addressed to the terminal 11.

The bandwidth setting response is transferred by the wireless slave devices 2B and 3B (15 and 16), and received by the terminal 11.

The 802.11e-compliant wireless slave devices 2B and 3B can judge whether to perform DLS setting when a bandwidth setting request is received from a terminal connected thereto by wire, since the wireless slave devices 2B and 3B can determine, before receiving a bandwidth setting request, to which other wireless slave device the other terminal is connected by referring to the connection information storage unit 402.

Also, extra wireless resources are not consumed since the wireless slave devices use a known protocol (ARP) to notify the other wireless slave devices of the MAC addresses of connected terminals.

Moreover, employing the relatively inexpensive wireless slave devices 2B and 3B enables a reduction in needless wireless communication without modifying the relatively expensive wireless master device 1, thereby making it is easy for a user to employ the wireless slave devices 2B and 3B.

Supplementary Remarks

Note that the present invention is of course not limited to the above-mentioned embodiments. The following are also included in the present invention.

(1) Although four terminals can be connected by wire to the wireless slave devices in the above-mentioned embodiments, the present invention is not limited to this; one terminal, five terminals etc. may be connected.

(2) The method for updating the content recorded in the first table storage unit 125 may be a method of transmitting a wire frame requesting a response from addressed terminals, such as an RARP (Reverse Address Resolution Protocol) addressed to the MAC addresses recorded in the first table storage unit 125, and performing updating based on whether or not there are responses.

(3) Although connection information is attached to an ARP packet by the connection information attaching unit to create the connection information management table in embodiment 4, connection information may be attached to packets transmitted and relayed by a wireless relay apparatus to create the connection information management table.

(4) Although bandwidth setting requests and bandwidth setting responses, which are communication flows of a bandwidth reservation-type communication protocol, are used as triggers to initiate direct communication flows between wireless slave devices in embodiment 4, settings in the direction communication between wireless slave devices of the present invention are not limited to this case.

(5) Although the connection information analysis unit 400 described in embodiment 4 analyzes whether there is connection information pertaining to other wireless slave devices attached to the ARP packet, and performs the next operation based on the result, the connection information analysis unit 400 may judge whether the ARP packet was received by either the wire transmission/reception unit 120 or the wireless transmission/reception unit 121, and perform the next operation based on the result. For example, if the ARP packet was received by the wire transmission/reception unit 120, the connection information analysis unit 400 transfers the ARP packet to the connection information attaching unit 400. Conversely, if the ARP packet was received by the wireless transmission/reception unit 121, the connection information analysis unit 400 may transfer the connection information attached to the ARP packet to the connection information storage unit 402, and transfer, to the wire transmission/reception unit 120, the ARP packet from which the attached connection information has been removed.

(6) The notification frame, the request frame and the connection information are not limited to the data structures shown in FIGS. 8, 16, 17 and 21.

(7) The MAC address of the wireless master device 1 may be a BSSID (Basic Service Set Identifier).

(8) Structures of the above-mentioned embodiments may be realized by LSI (Large Scale Integration), which is typically an integrated circuit. The structures may be realized on separate chips, or a portion or all of the structures may be included on a single chip. Depending on the degree of integration, the integrated circuit can be called an IC, a system LSI, a super LSI, an ultra LSI, or the like. Also, the method used to realize the integrated circuit is not limited to LSI. The integrated circuit may be realized by a special-purpose circuit or a general-purpose processor. Moreover, an FPGA (Field Programmable Gate Array), a reconfigurable processor in which it is possible to restructure settings and connections of circuit cells in the LSI, or the like may be used.

Moreover, if a circuit integration technology to replace current semiconductor technology appears due to a development of or derivation from semiconductor technology, such circuit integration technology may be used to integrate the function blocks. One such example is an application of biotechnology.

INDUSTRIAL APPLICABILITY

The present invention can be applied to a wireless slave device that performs, in a network area of a wireless network managed by a wireless master device, wireless network communication with another wireless slave device connected by wire to a terminal, and wired network communication with a terminal connected by wire to the wireless slave device.

The invention claimed is:

1. A wireless slave device for performing, in a wireless network managed by a wireless master device, wireless network communication with the wireless master device, and for performing wired network communication with one or more terminals connected by wire to the wireless slave device, the wireless slave device comprising:

a wireless reception unit operable to wirelessly receive, from the wireless master device that relays communication between the wireless slave device and another wireless slave device that belongs to the wireless network, a wireless frame that is (i) transmitted from one or more other terminals connected by wire to the other wireless slave device and (ii) addressed to the one or more terminals connected by wire to the wireless slave device, the wireless frame storing, in a frame body, (a) data of a first frame that includes information indicating an address of the one or more other terminals and (b) connection information indicating an address of the other wireless slave device which relays the first frame, the address of the other wireless slave device being added by the other wireless slave device;

a storage unit operable to store the address of the other wireless slave device in association with each of the addresses of the one or more other terminals included in the wirelessly received wireless frame;

a wire reception unit operable to receive, by wire, a second frame that includes a transmission destination address and that has been transmitted from the one or more terminals connected by wire to the wireless slave device; and a setting unit operable, when the transmission destination address of the second frame received by the wire reception unit matches any of the addresses of the one or more other terminals stored in the storage unit, to specify the address of the other wireless slave device stored in association with the address of each of the one or more other terminals and to perform a setting for direct wireless communication without involving the wireless master device.

2. The wireless slave device of claim 1, wherein the wireless frame further includes information showing an address of a BSSID (Basic Service Set Identifier) of a wireless master device to which the other wireless slave device belongs, and wherein, when the address or the BSSID of the wireless master device matches an address of a BSSID of a wireless master device to which the wireless slave device belongs, the storage unit stores the address of the other wireless slave device included in the wireless frame in association with each of the addresses of the one or more other terminals.

3. The wireless slave device of claim 2, wherein the wireless frame is an ARP (Address Resolution Protocol) Request packet of an ARP Response packet transmitted by the one or more other terminals to the one or more terminals, and wherein the other wireless slave device, which relays the ARP Request packet and the ARP Response packet, adds information to the wireless frame showing the address of the other wireless slave device and an address or a BSSID of the wireless master device to which the another wireless slave device belongs.

4. The wireless slave device of claim 3, further comprising a packet identification unit operable to identify a kind of the second frame received by the wire reception unit, and wherein, when the packet identification unit identifies that the second frame received by the wire reception unit is a bandwidth setting request transmitted by the one or more terminals to the one or more other terminals so as to ensure communication required for data transmission, the setting unit specifies the address of the other wireless slave device stored in association with each of the addresses of one or more other terminals, and performs a setting for direct wireless communication without involving the wireless master device.

5. The wireless slave device of claim 4, further comprising a wireless transmitting unit operable, when the setting unit has succeeded in performing the setting for direct wireless communication with the other wireless slave device, to directly wirelessly transmit the bandwidth setting request to the other wireless slave device.

* * * * *